United States Patent
Quirynen et al.

(10) Patent No.: US 10,613,490 B2
(45) Date of Patent: Apr. 7, 2020

(54) METHOD AND APPARATUS FOR PRECONDITIONED PREDICTIVE CONTROL

(71) Applicant: Mitsubishi Electric Research Laboratories, Inc., Cambridge, MA (US)

(72) Inventors: Rien Quirynen, Cambridge, MA (US); Andrei Kniazev, Cambridge, MA (US); Stefano Di Cairano, Newton, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 86 days.

(21) Appl. No.: 15/888,143

(22) Filed: Feb. 5, 2018

(65) Prior Publication Data

US 2019/0243320 A1 Aug. 8, 2019

(51) Int. Cl.
*G05B 13/04* (2006.01)
*G06F 16/23* (2019.01)
(Continued)

(52) U.S. Cl.
CPC .......... *G05B 13/048* (2013.01); *B25J 9/1607* (2013.01); *G06F 16/23* (2019.01); *G06F 17/11* (2013.01); *G06F 17/16* (2013.01)

(58) Field of Classification Search
CPC ....... G05B 13/048; G06F 16/23; G06F 17/11; G06F 17/16
(Continued)

(56) References Cited

U.S. PATENT DOCUMENTS 4,972,347 A * 11/1990 Tarvin ................... B25J 9/1692
318/568.13
6,182,270 B1 * 1/2001 Feldmann ............... G06F 17/12
703/14
(Continued)

OTHER PUBLICATIONS

Gould et al., "On the solution of equality constrained quadratic programming problems arising in optimization." Department for Computation and Information Atlas Centre, Rutherford Appleton Laboratory, Oxfordshire OX11 0QX. Sep. 30, 1998.
(Continued)

*Primary Examiner* — Kenneth M Lo
*Assistant Examiner* — Michael W Choi
(74) *Attorney, Agent, or Firm* — Gennadiy Vinokur; Hironori Tsukamoto; James McAleenan

(57) ABSTRACT

A predictive controller for controlling a system subject to constraints including equality and inequality constraints on state and control variables of the system, includes an estimator to estimate a current state of the system using measurements of outputs of the system and a controller to solve, at each control step, a matrix equation of necessary optimality conditions to produce a control solution and to control the system using the control solution to change a state of the system. The matrix equation includes a block-structured matrix having a constraint Jacobian matrix of the equality constraints of the system. The controller determines the control solution iteratively using two levels of iterations including a first level of iterations that selects active inequality constraints for each point of time within a control horizon, updates the constraint Jacobian matrix, with a low-rank update for a change in the set of active inequality constraints, to include the equality constraints and the active inequality constraints, and updates a preconditioning matrix, with a low-rank factorization update, in response to the low-rank update of the constraint Jacobian matrix. The
(Continued)

second level of iterations solves the matrix equation with the updated constraint Jacobian matrix using the updated preconditioning matrix to produce the control solution.

22 Claims, 24 Drawing Sheets

(51) Int. Cl.
*G06F 17/11* (2006.01)
*G06F 17/16* (2006.01)
*B25J 9/16* (2006.01)

(58) Field of Classification Search
USPC .......................................................... 700/29
See application file for complete search history.

(56) References Cited

U.S. PATENT DOCUMENTS

| | | | |
|---|---|---|---|
| 6,278,906 | B1 | 8/2001 | Piepmeier et al. |
| 6,701,193 | B1 | 3/2004 | Filev et al. |
| 8,924,331 | B2 | 12/2014 | Pekar et al. |
| 9,897,984 | B2 | 2/2018 | Benosman et al. |
| 9,983,554 | B2 | 5/2018 | Di Cairano et al. |
| 2004/0010701 | A1 | 6/2004 | Das et al. |
| 2006/0282178 | A1 | 12/2006 | Das et al. |
| 2013/0325148 | A1 | 12/2013 | Mustafa et al. |
| 2015/0025374 | A1 | 1/2015 | Neer et al. |
| 2015/0253749 | A1* | 9/2015 | Kniazev ............... G05B 13/048 700/29 |
| 2017/0031332 | A1 | 2/2017 | Santin |
| 2019/0101877 | A1* | 4/2019 | Jiang ................... G05B 13/048 |

OTHER PUBLICATIONS

Kirches et al., "A factorization with update procedures for a KKT matrix arising in direct optimal control." Math. Prog. Comp. (2011) 3:319-348, DOI 10.1007/s12532-011-0030-z. / Accepted: Jul. 15, 2011 / Published online: Aug. 20, 2011, © Springer and Mathematical Optimization Society 2011.

Shahzad et al., "Preconditioners for Inexact Interior Point Methods for Predictive Control." 2010 American Control Conference, Marriott Waterfront, Baltimore, MD, USA. Jun. 30-Jul. 2, 2010. pp. 5714-5719.

Benosman et al., "Extremum Seeking Based Iterative Learning Linear MPC." 2014 IEEE Conference on Control Applications, 2014 IEEE Multi Conference on Systems and Control. Oct. 8-10, 2014, Antibes, France. pp. 1849-1854.

Sabbaraman et al., "Extremum Seeking Based Iterative Learning Model Predictive Control, (ESILC-MPC)." ScienceDirece, IFAC PapersOnline 49-13 (2016) pp. 193-198.

\* cited by examiner

Algorithm 1 Primal Feasible Active-Set Method.

Input: feasible starting point $y_0$ and working set $\mathcal{W}_0$. —401

1: for iter $= 1, 2, \ldots,$ max do —402
2:   Solve the QP in (2), i.e., the linear system in (3), to —405
    compute the search direction $(\Delta y, \Delta \lambda)$.
3:   if $\exists (k,j) \in \mathcal{W} : \lambda^*_{k,j} < 0$ then —407
4:     $\mathcal{W} \leftarrow \mathcal{W} \setminus \{\arg\min_{(k,j) \in \mathcal{W}} \lambda^*_{k,j}\}$.   (remove) —410
5:   else
6:     if blocking constraints then —406, 415
7:       $\mathcal{W} \leftarrow \mathcal{W} \cup \{(k,j)\}$.   (add constraint) —420
8:       $\alpha \leftarrow \frac{d_{k,j} + D_{k,j} w_k}{D_{k,j} \Delta w_k}$.   (step length) —421
9:       $y^* \leftarrow y + \alpha \Delta y$ and $\lambda^* \leftarrow \lambda + \alpha \Delta \lambda$. —422
10:    else
11:      $y^* \leftarrow y + \Delta y$ and $\lambda^* \leftarrow \lambda + \Delta \lambda$. —355
12:      stop   (QP solved)

Output: Optimal $y^*$ and $\lambda^*$ for the QP

Given the active set of inequality constraints, formulate the equality constrained QP $$\min_{\Delta X, \Delta U} \sum_{k=0}^{N-1} \frac{1}{2} \Delta w_k^T H_k \Delta w_k + [\tilde{q}_k^T \ \tilde{r}_k^T] \Delta w_k \quad 701$$
$$+ \frac{1}{2} \Delta x_N^T Q_N \Delta x_N + \tilde{q}_N^T \Delta x_N$$

s.t. $\quad \Delta x_0 = 0,\quad 702$
$\quad \Delta x_{k+1} = A_k \Delta x_k + B_k \Delta u_k,\ k=0,\ldots,N-1,\quad 703$
$\quad 0 = D_{k,i}^x \Delta x_k + D_{k,i}^u \Delta u_k,\quad (k,i) \in \mathcal{W},\quad 704$ Solve the saddle point linear system (KKT system) that defines the necessary optimality conditions for the equality constrained quadratic program:

706 $\begin{bmatrix} \mathcal{H} & A^T \\ A & 0 \end{bmatrix} \begin{bmatrix} \Delta y \\ \Delta \lambda \end{bmatrix} = -\begin{bmatrix} h \\ a \end{bmatrix}$ or $\mathcal{K} z = b,\quad 707$ $H_k := \begin{bmatrix} Q_k & S_k^T \\ S_k & R_k \end{bmatrix} \succeq 0, k=0,\ldots,N-1$ and $Q_N \succeq 0,\quad 708$ where $H$ defines the block-diagonal Hessian in the KKT matrix and $A$ defines the block-structured Jacobian in the KKT matrix $$A = \begin{bmatrix} -1 & & & & \\ E_0^x & E_0^u & -1 & & \\ A_0 & B_0 & -1 & & 0 \\ & & E_0^x & E_0^u & -1 & 0 \\ & & C_0 & & -1 & \cdots \\ & & & & & \ddots \end{bmatrix} \quad 709$$ 

FIG. 7A

1225 — The constraint preconditioner projects a vector onto the null space of the equality constraints and active inequality constraints in the constraint Jacobian matrix $A$ $$\begin{pmatrix} \widetilde{H} & A^T \\ A & 0 \end{pmatrix} \begin{pmatrix} z_1 \\ z_2 \end{pmatrix} = \begin{pmatrix} b \\ 0 \end{pmatrix} \quad 1226$$

1227 — For an invertible $\widetilde{H}$, the projection operator can be written as $$z_1 = P_{A;H} b \quad \text{where} \quad P_{A;H} = \widetilde{H}^{-1}(I - A^T(A\widetilde{H}^{-1}A^T)^{-1}A\widetilde{H}^{-1})$$

or $$z_1 = \widetilde{H}^{-1}b - \widetilde{H}^{-1}A^T z_2 \quad \text{where} \quad z_2 = (A\widetilde{H}^{-1}A^T)^{-1}A\widetilde{H}^{-1}b$$

FIG. 12B

METHOD AND APPARATUS FOR PRECONDITIONED PREDICTIVE CONTROL

TECHNICAL FIELD

The invention relates generally to predictive control, and more particularly to a method and apparatus for preconditioned predictive control of dynamical systems in the presence of inequality constraints.

BACKGROUND

A predictive controller, such as model predictive control (MPC), is used in many applications to control complex dynamical systems. Examples of such systems include production lines, vehicles, satellites, engines, robots, power generators and other numerically controlled machines.

Dynamic optimization based predictive control and estimation can significantly speed up the design process for the controller and estimator. In addition, dynamic optimization allows to directly take control or estimation objectives into account as well as the system dynamics and constraints or limitations related to the states and controls of the system. For real-time applications of predictive control or estimation, an optimal control problem needs to be solved under strict timing constraints, often on embedded hardware with limited computational resources.

Most embedded optimization methods that have successfully been applied to real-time optimal control rely on direct linear algebra routines, see, e.g., U.S. 2004/0107012. However, the computational complexity of those direct solution procedures is $O(Nm^3)$, when explicitly taking the block-structured sparsity of the optimization problem into account in a second order optimization method. This means that the computational cost scales linearly with the horizon length, N, but cubically with the number of states and controls of the system, i.e., m. The latter cubic complexity is undesirable for some real-time applications of optimal control and estimation. On the other hand, after eliminating the state variables from the optimization problem based on the discrete-time dynamics of the system, the use of a first order optimization method alternatively results in a computational complexity of $O(N^2m^2)$. The computational cost scales quadratically with the number of states and controls of the system, i.e., in, but it scales also quadratically with the horizon length, N. The latter quadratic complexity is undesirable for some real-time applications of optimal control and estimation.

SUMMARY

Some embodiments are based on recognition that iterative methods to solve the dynamic optimization problem can result in a better asymptotic computational complexity when solving the saddle point linear systems arising in second order optimization. In addition, iterative solvers are suitable for hardware acceleration of the linear system solution, e.g., using an FPGA for fast embedded applications, due to their higher ratio of addition and multiplication operations. The use of an iterative method also allows to make a trade-off between computational time and numerical accuracy of the solution. However, iterative solvers tend to converge poorly without preconditioning and the preconditioner needs to be efficient to produce. Accordingly, there is a need for an iterative preconditioned solver suitable for real-time optimal control of dynamical systems.

To that end, it is an object of some embodiments to provide a system and a method for controlling a system by solving an inequality constrained dynamic optimization problem using an iterative preconditioned method. It is an object of some embodiments to provide an iterative preconditioned solver with computational cost that scales linearly with the number of intervals and quadratically with the number of state and control variables in the dynamic system. The scaling of the computational complexity and of the memory requirements, based on the dimensions of the control problem, is therefore $O(Nm^2)$, where N is the control horizon length and m is the number of states and controls. It is another object of one embodiment to provide a solver with a deterministic behavior in the number of iterations and corresponding computation time to solve the optimization problems.

It is another object of some embodiments to provide a solver suitable to be implemented on embedded hardware for real-time optimal control. It is another object of one embodiment to provide a solver suitable for embedded control applications that require a self-contained solver code without unnecessary library dependencies. It is another object of one embodiment to provide a solver having acceptable real-time numerical performance on embedded control hardware with limited computational resources.

Some embodiments are based on second order optimization that solves directly the Karush-Kuhn-Tucker (KKT) equations of the optimal control problem, which form the necessary conditions of optimality. More specifically, the second order optimization requires repeatedly solving a matrix equation $Kz=b$ with the varying matrix K and the right-hand side vector b, for which an iterative solver can be used. For each time step of the control, the predictive controller generates, from the optimal solution to the inequality constrained optimization problem, a control action to control a system. Due to a particular block-sparsity structure in the matrix K when solving optimal control problems, a tailored structure-exploiting preconditioner for the iterative linear solver is needed in order to result in an optimal computational complexity. This is especially useful for real-time control applications with limited computational resources of the embedded control hardware.

Some embodiments are based on the realization that the convergence of the iterative solver can be improved with using a preconditioning matrix P that approximates the coefficient matrix K of the linear system. More specifically, the eigenvalues of the preconditioned matrix $P^{-1}K$ should be clustered more than those of the original matrix K in order to improve the convergence of the iterative solver. Some embodiments are based on the realization that iterative solvers cannot be used for most practical applications of optimal control without the use of a preconditioner. To that end, some embodiments are based on the realization that the matrix P can be formed to have a particular block sparsity structure, similar to the block structure in the sparse matrix K. The block-structured matrix P is much cheaper to form, update and to factorize than a dense matrix. To that end, a block-structured preconditioning matrix P is advantageous for the use of iterative solvers within optimal control algorithms.

Specifically, some embodiments are based on the understanding that the computational complexity of controlling the system is due to inequality constraints on the states and control inputs of the system. In contrast with equality constraints, the optimization algorithm needs to identify which of the inequality constraints are active at the optimal control solution, which is a combinatorial problem in general. Some embodiments are based on the realization that, for real-time optimal control applications, the optimal set of active constraints at the solution can be identified efficiently by using a tailored initialization based on the solution to the optimal control problem at the previous sampling instant.

Some embodiments are based on the recognition that the computational demand lies not only in constructing the preconditioning matrix P, but mostly in updating the matrix P within the second order optimization that either adds or removes a constraint from the current guess of the optimal active set. Such matrix updates take less resources than the initial computation and factorization of the preconditioning matrix. Armed with these understandings, some embodiments modify the iterative solution of the dynamic optimization problem to reduce the complexity of the solution when updating the current guess for the optimal active set, and therefore updating the matrix K and the preconditioning matrix P.

Some embodiments are based on the recognition that inequality constraints are active only when the states or controls of the controlled system approach the bounds of the inequality constraints at a particular point in the control horizon, and are inactive otherwise. At a different time step of the control and/or at different iterations of the optimization, different inequality constraints can be active or inactive. Some embodiments are based on the recognition that the inactive inequality constraints can be ignored, and the active inequality constraints can be replaced with equality constraints forming the dynamic optimization problem subject only to the equality constraints. By solving this equality constrained optimization problem instead, the original optimal control solution can be recovered when the current guess for the set of active constraints is optimal. In the case when the current active set is not optimal, the equality constrained solution provides a search direction to identify which constraints should be added and/or removed from the current guess in order to iteratively find the optimal active set and therefore the exact solution to the original inequality constrained optimization problem.

Replacement of the active inequality constraints with equality constraints results in an equality constrained optimization problem for which the KKT equations correspond to a saddle point linear system. The matrix K of this matrix equation is a block-structured KKT matrix referred herein as the KKT matrix. The KKT matrix includes a block-diagonal Hessian matrix and a block-structured Jacobian matrix. Some embodiments are based on the realization that a change to the current active set results in a low-rank update to the Jacobian matrix. More specifically, when adding or removing only one constraint in the active set, a rank-one update can be computed for the Jacobian in the matrix K and for the corresponding preconditioning matrix P. Such a low-rank update to the factorized preconditioner requires less computational resources than the computation of a new matrix factorization. In the specific case of the block sparsity structured matrices in optimal control problems, these low-rank factorization update techniques lead to an optimal computational complexity.

Usually, a solution of the KKT system with a preconditioner requires a new preconditioner for each iterative solution of the matrix equation. This is because the preconditioner is a function of the KKT matrix in the matrix equation and with a change of the KKT matrix, a new preconditioner should be used.

Some embodiments are based on the realization that when the KKT optimality equations are solved with an active set approach, only the constraint Jacobian matrix of the KKT matrix is changed for each iterative solution. Moreover, such an update of the constraint Jacobian matrix is of rank one.

Some embodiments are based on the realization that when only the constraint Jacobian matrix is updated with the low-rank update, despite the fact that the preconditioner is a function of the entire KKT matrix, the low-rank update of the constraint Jacobian matrix leads to a low-rank update of the entire preconditioner. In such a manner, the complexity of recomputing the preconditioner for each iterative solution of the matrix equation is reduced to a low-rank update of the previously determined preconditioner.

Some embodiments are based on the realization that because the constraint Jacobian matrix has a multi-stage block sparsity structure, then the preconditioner for solving the KKT system can have a block-tridiagonal sparsity structure. The preconditioner is a function of the constraint Jacobian matrix. Every time, when the constraint Jacobian matrix is updated, some embodiments update the preconditioner while preserving the block-tridiagonal sparsity structure.

Some embodiments are based on the recognition that the constraint Jacobian matrix is frequently updated due to the change in the active set of inequality constraints. Those updates are rank-one updates when only one constraint is added or removed from the active set. The rank-one update of the constraint Jacobian matrix leads to the rank-one update of the preconditioner. Such a low-rank update of the preconditioner can still be computationally expensive due to the matrix factorization of the preconditioner needed to solve the matrix equation.

However, due to its block-tridiagonal sparsity structure, matrix factorization of the preconditioner can be computed in a computationally efficient way, using a block-tridiagonal Cholesky factorization. Low-rank updates in combination with such an efficient matrix factorization result in a computationally optimal factorization update that can preserve the block-tridiagonal sparsity structure.

Some embodiments solve the matrix equation, within each iteration of the active-set based optimization algorithm, iteratively using a block-tridiagonal Cholesky factorization of a preconditioning matrix in order to efficiently apply the inverse of the preconditioner. In this embodiment, the preconditioning matrix has a block-tridiagonal structure, wherein each block is positive definite such that a block-structured Cholesky factorization can be used.

The embodiment updates the Jacobian matrix and the preconditioning matrix in response to a change in the set of active inequality constraints. In such a manner, the update of the Jacobian matrix and the preconditioning matrix is a low-rank factorization update. However, during the update procedure, one embodiment preserves the block sparsity structure of those matrices. In addition, also the back substitutions to apply the inverse of the preconditioner requires a computational cost of complexity $O(Nm^2)$, based on its block-structured Cholesky factors. In such a manner, the overall computational complexity of this iterative preconditioned solver within an active-set based optimization algorithm for real-time optimal control is $O(Nm^2)$. This makes the computational cost of the solver in this embodiment to scale linearly with the number of control intervals, N, and quadratically with the number of state and control variables in the system, m.

Some embodiments are based on the recognition that the iterative nature of the solver allows to warm-start the Jacobian matrix in the preconditioning matrix and/or the block-tridiagonal Cholesky factorization of the preconditioner, based on the values of those matrices determined during previous time steps in the closed-loop control scheme. Those embodiments can further reduce the computational resources that are required for initializing those matrices and factorizations. In addition, some embodiments are based on the realization that the early termination of the active-set based optimization algorithm results in a suboptimal control solution that satisfies all constraints and limitations of the controlled system. This leads to a deterministic computational delay for real-time control applications, where either an optimal or suboptimal control input can be applied to the system, while respecting all of the constraints.

Accordingly, one embodiment discloses a predictive controller for controlling a system subject to constraints including equality and inequality constraints on state and control variables of the system. The predictive controller includes an estimator to estimate a current state of the system using measurements of outputs of the system; and a controller to solve, at each control step, a matrix equation of necessary optimality conditions to produce a control solution and to control the system using the control solution to change a state of the system, wherein the matrix equation includes a block-structured matrix having a constraint Jacobian matrix of the equality constraints of the system, wherein the controller determines the control solution iteratively using two levels of iterations including a first level of iterations and a second level of iterations performed within an iteration of the first level of iterations, wherein the first level of iterations, performed until a first termination condition is met, selects active inequality constraints for each point of time within a control horizon, updates the constraint Jacobian matrix, with a low-rank update for a single change in the set of active inequality constraints, to include the equality constraints and the active inequality constraints, and updates a preconditioning matrix, with a low-rank factorization update, in response to the low-rank update of the constraint Jacobian matrix, wherein the second level of iterations, performed until a second termination condition is met, solves the matrix equation with the updated constraint Jacobian matrix using the updated preconditioning matrix to produce the control solution.

Another embodiment discloses a method for controlling a system subject to constraints including equality and inequality constraints on state and control variables of the system, wherein the method uses a processor coupled with stored instructions implementing the method, wherein the instructions, when executed by the processor carry out steps of the method, including estimating a current state of the system using measurements of outputs of the system; solving, at each control step, a matrix equation of necessary optimality conditions to produce a control solution; and controlling the system using the control solution to change a state of the system, wherein the matrix equation includes a block-structured matrix having a constraint Jacobian matrix of the equality constraints of the system, wherein the controller determines the control solution iteratively using two levels of iterations including a first level of iterations and a second level of iterations performed within an iteration of the first level of iterations, wherein the first level of iterations, performed until a first termination condition is met, selects active inequality constraints for each point of time within a control horizon, updates the constraint Jacobian matrix, with a low-rank update for a single change in the set of active inequality constraints, to include the equality constraints and the active inequality constraints, and updates a preconditioning matrix, with a low-rank factorization update, in response to the low-rank update of the constraint Jacobian matrix, wherein the second level of iterations, performed until a second termination condition is met, solves the matrix equation with the updated constraint Jacobian matrix using the updated factorization of the preconditioning matrix to produce the control solution.

Yet another embodiment discloses a non-transitory computer readable storage medium embodied thereon a program executable by a processor for performing a method, the method includes estimating a current state of the system using measurements of outputs of the system; solving, at each control step, a matrix equation of necessary optimality conditions to produce a control solution; and controlling the system using the control solution to change a state of the system, wherein the matrix equation includes a block-structured matrix having a constraint Jacobian matrix of the equality constraints of the system, wherein the controller determines the control solution iteratively using two levels of iterations including a first level of iterations and a second level of iterations performed within an iteration of the first level of iterations, wherein the first level of iterations, performed until a first termination condition is met, selects active inequality constraints for each point of time within a control horizon, updates the constraint Jacobian matrix, with a low-rank update for a single change in the set of active inequality constraints, to include the equality constraints and the active inequality constraints, and updates a preconditioning matrix, with a low-rank factorization update, in response to the low-rank update of the constraint Jacobian matrix, wherein the second level of iterations, performed until a second termination condition is met, solves the matrix equation with the updated constraint Jacobian matrix using the updated factorization of the preconditioning matrix to produce the control solution.

BRIEF DESCRIPTION OF THE DRAWINGS

FIG. 4B is a pseudo code of an active-set optimization to implement an MPC controller according to one embodiment;

FIG. 7A is a block diagram of the linear system of KKT optimality conditions that is solved after each active-set change in the MPC controller according to some embodiments;

FIG. 12B is a schematic of applying the constraint preconditioner within a projected preconditioned conjugate gradient method for MPC according to some embodiments;

DETAILED DESCRIPTION

Some embodiments of the invention provide a system and a method for controlling an operation of a system or a system using a predictive controller. AN example of the predictive controller is a model predictive control (MPC) determining control inputs based on a model of the controlled system.

Figure 1:
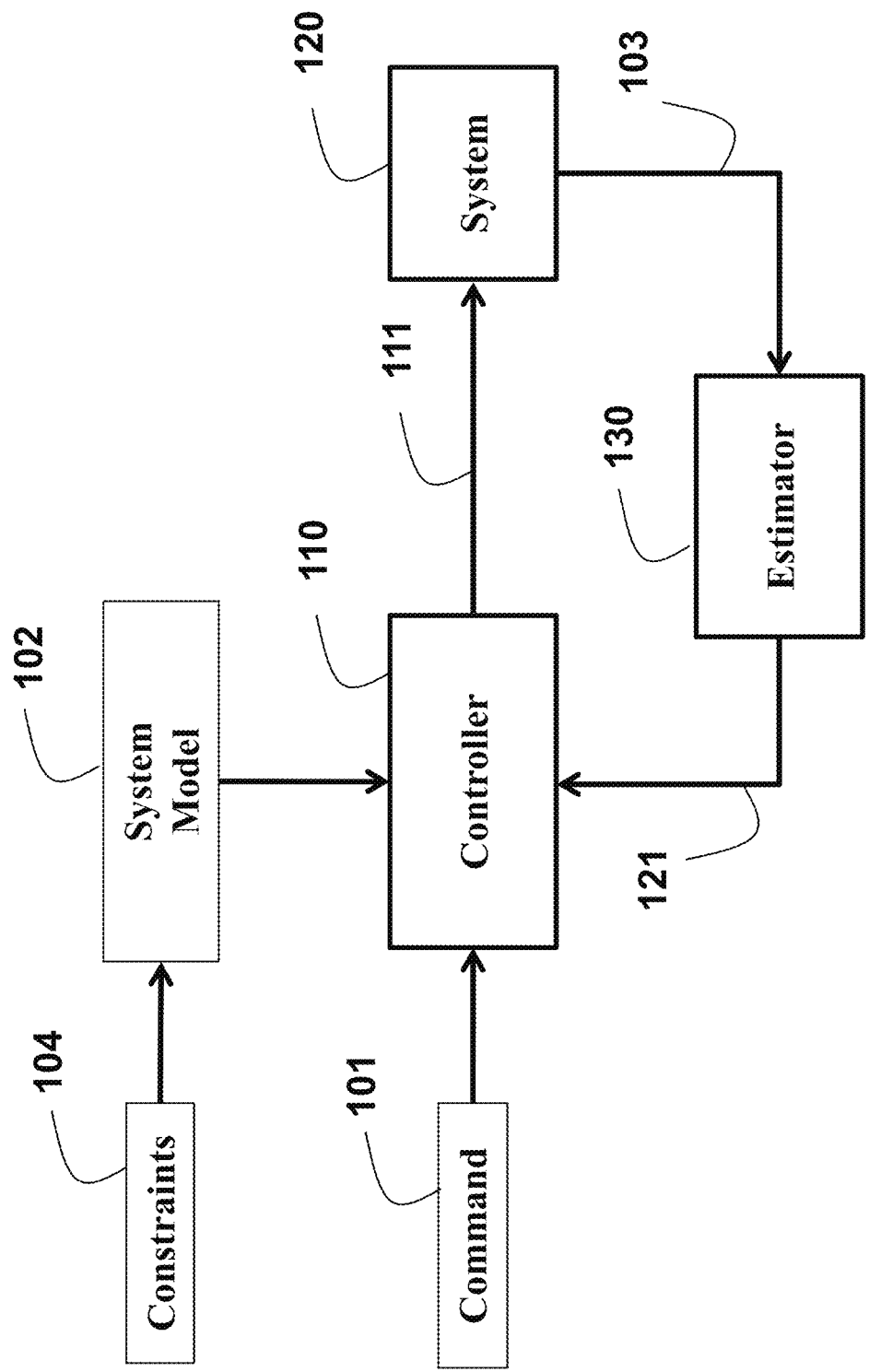
FIG. 1 is a block diagram of a controller and feedback system according to some embodiments.

FIG. 1 shows an example system 120 connected to a predictive controller 110 via a state estimator 130. In some implementations, the predictive controller is an MPC controller programmed according to a dynamical model 102 of the system. The model can be a set of equations representing changes of the state and output 103 of the system 120 over time as functions of current and previous inputs 111 and previous outputs 103. The model can include constraints 104 that represent physical and operational limitations of the system. During the operation, the controller receives a command 101 indicating the desired behavior of the system. The command can be, for example, a motion command. In response to receiving the command 101, the controller generates a control signal 111 that serves as an input for the system. In response to the input, the system updates the output 103 of the system. Based on measurements of the output of the system 103, the estimator updates the estimated state of the system 121. This estimated state of the system 121 provides the state feedback to the controller 110.

The system 120, as referred herein, can be any machine or device controlled by certain manipulation input signals 111 (inputs), possibly associated to physical quantities such as voltages, pressures, forces, torques, and to return some controlled output signals 103 (outputs), possibly associated to physical quantities such as currents, flows, velocities, positions indicative of a transition of a state of the system from a previous state to the current state. The output values are related in part to previous output values of the system, and in part to previous and current input values. The dependency on previous inputs and previous outputs is encoded in the state of the system. The operation of the system, e.g., a motion of components of the system, can include a sequence of output values generated by the system following the application of certain input values.

A model of the system 102 can include a set of mathematical equations that describe how the system outputs change over time as functions of current and previous inputs, and the previous outputs. The state of the system is any set of information, in general time varying, for instance an appropriate subset of current and previous inputs and outputs, that, together with the model of the system and future inputs, can uniquely define the future motion of the system.

The system can be subject to physical limitations and specification constraints 104 limiting the range where the outputs, the inputs, and also possibly the states of the system are allowed to operate.

The controller 110 can be implemented in hardware or as a software program executed in a processor, e.g., a microprocessor, which at fixed or variable control period sampling intervals receives the estimated state of the system 121 and the desired motion command 101 and determines, using this information, the inputs, e.g., the control signal 111, for operating the system.

The estimator 130 can be implemented in hardware or as a software program executed in a processor, either the same or a different processor from the controller 110, which at fixed or variable control period sampling intervals receives the outputs of the system 103 and determines, using the new and the previous output measurements, the estimated state 121 of the system 120.

Figure 2:
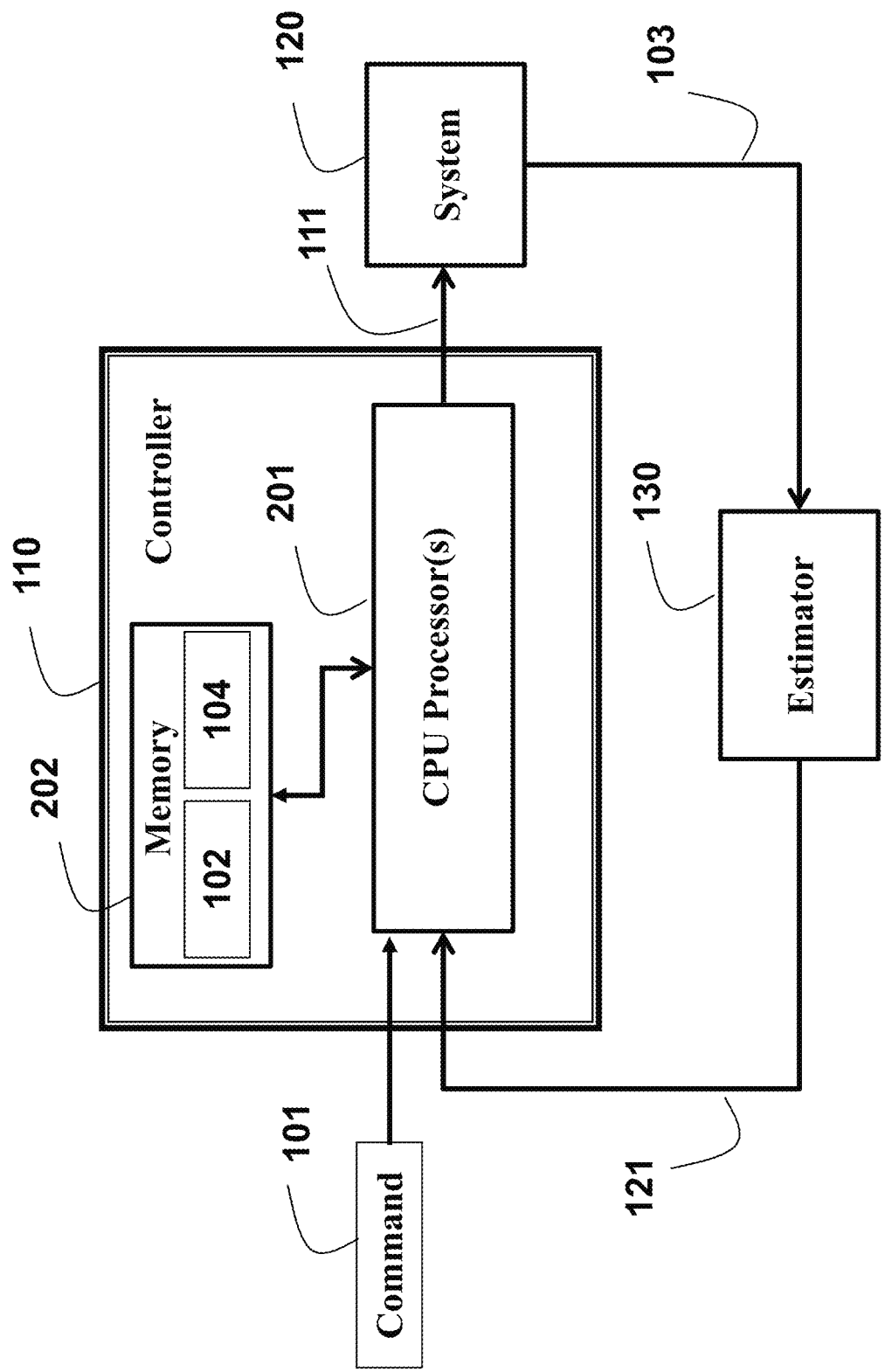
FIG. 2 is a block diagram of a controller, implemented using CPU processors and memory, and feedback system according to some embodiments of the invention.

FIG. 2 shows a block diagram of the controller 110, according to some embodiments of the invention, which actuates the system such that the estimated state 121 of the system and output 103 follow a command 101. The controller 110 includes a computer, e.g., in the form of a single central processing unit (CPU) or multiple CPU processors 201 connected to memory 202 for storing the model 102 and the constraints 104 on the operation of the system.

Figure 3A:
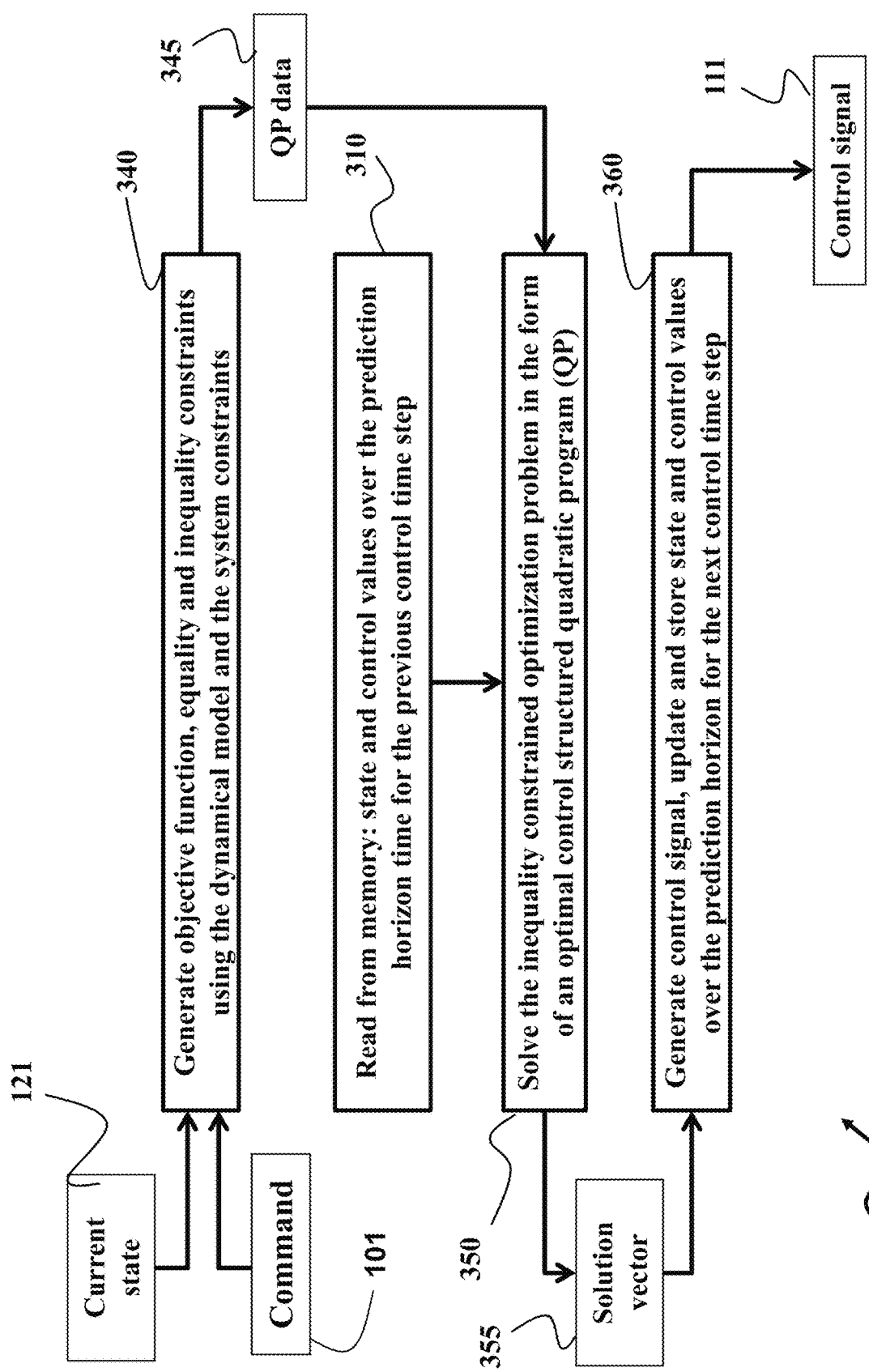
FIG. 3A is a block diagram of a model predictive control (MPC) method to implement the controller according to some embodiments.

FIG. 3A shows a block diagram of a system and a method for model predictive control (MPC) to implement the controller 110 that computes the control signal 111, given the current state of the system 121 and the control command 101 according to some embodiments. Specifically, MPC computes a control solution, e.g., a solution vector 355, that contains a sequence of future optimal control inputs over a prediction time horizon of the system 360, by solving an inequality constrained optimization problem 350 at each control time step. The data 345 of the objective function, equality and inequality constraints in this optimization problem 350 depends on the dynamical model, the system constraints 340, the current state of the system 121 and the control command 101.

In some embodiments, the solution of this inequality constrained optimization problem 350 uses the state and control values over the prediction time horizon from the previous control time step 310, which can be read from the memory. This concept is called warm- or hot-starting of the optimization algorithm and it can considerably reduce the required computational effort of the MPC controller in some embodiments. In a similar fashion, the corresponding solution vector 355 can be used to update and store a sequence of optimal state and control values for the next control time step 360.

Figure 3B:
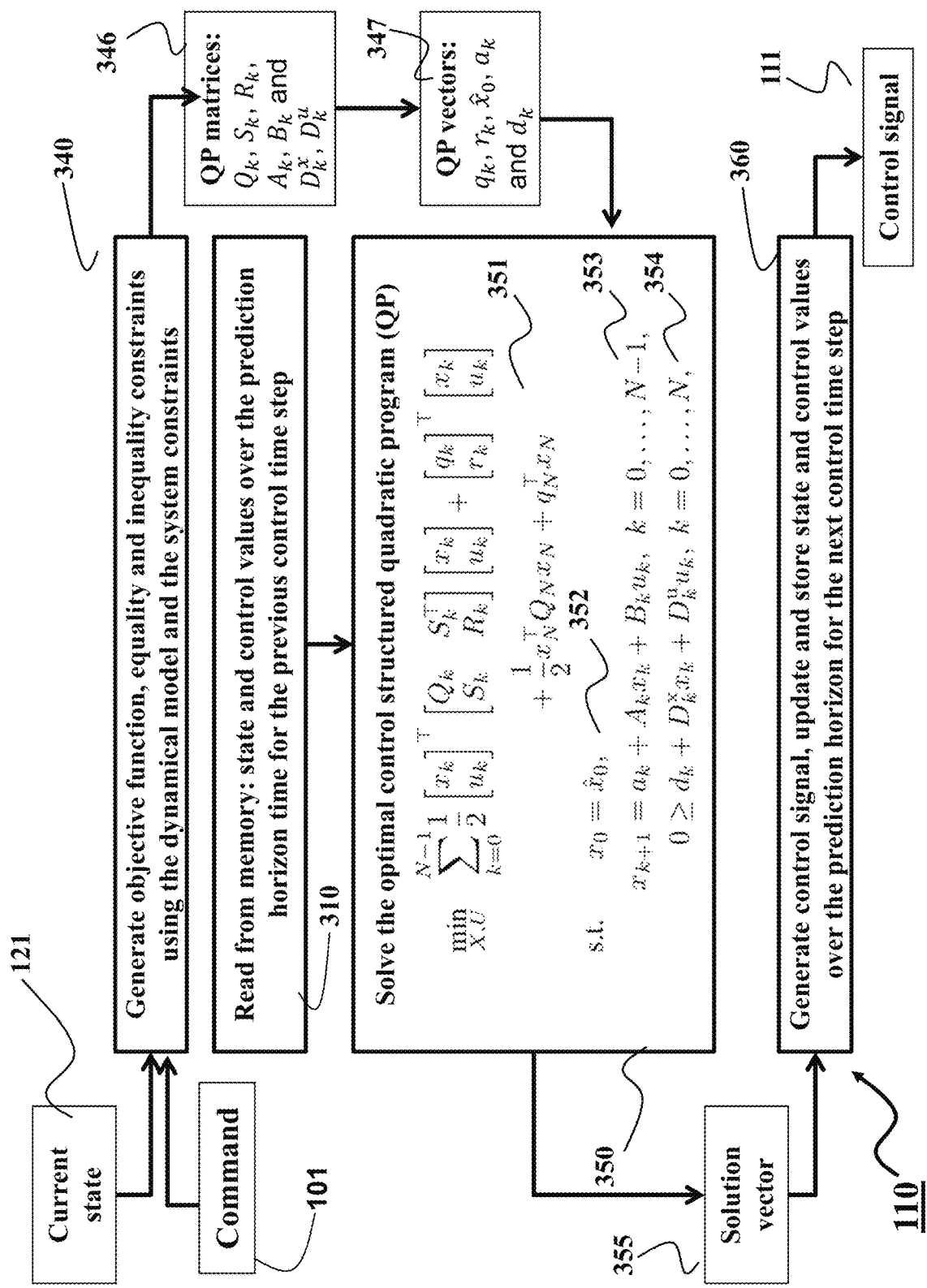
FIG. 3B is a block diagram of an MPC method that solves an optimal control structured Quadratic Program (QP) according to some embodiments.

FIG. 3B shows a block diagram of an MPC controller that solves an optimal control structured optimization problem 350 in order to compute the signal 111 at each control time step, given the current state of the system 121 and the command 101. Some embodiments are based on a linear dynamical model of the system 353 with linear equality 352 and inequality constraints 354 and a linear-quadratic objective function 351, such that a constrained quadratic program (QP) 350 needs to be solved at each control time step. Specifically, the QP data 345 then include the Hessian and constraint Jacobian matrices 346 and the corresponding gradient and constraint evaluation vectors 347.

In some embodiments, e.g., based on a linear time-invariant (LTI) dynamical model and time-invariant constraints of the system, only the QP vectors 347 can change from one control time step to the next and the QP matrices 346 are constant instead. In this linear time-invariant case, some embodiments can use hot-starting of the optimization algorithm, based on the reuse of matrix factorizations that are related to the constant QP matrices in order to reduce the required computational effort of the MPC method at each control time step. In other embodiments, given a time-varying description of the dynamical model and/or constraints and limitations of the system, both the QP vectors 347 and the QP matrices 346 can change from one control time step to the next.

Some embodiments are based on recognition that The second order optimization algorithm requires repeatedly solving a matrix equation Kz=b with the varying matrix K and the right-hand side vector b. However, iterative solvers tend to converge poorly without preconditioning. To that end, there is a design an efficient preconditioning matrix P to solve $P^{-1}Kz=P^{-1}b$ with computational cost $O(Nm^2)$ per iteration.

In general, computing a preconditioning matrix P can be a computationally demanding task. However, some embodiments are based on realization, that under some circumstances, the preconditioning matrix P can be replaced with a number of matrix updates. Moreover, using some sparse structure of the matrices, those multiple updates are of low rank, which leads to the desired computational cost of $O(Nm^2)$.

Specifically, it is realized that the system control is subject to equality and inequality constraints on the states and control inputs of the system, while the computational complexity is mostly due to inequality constraints. At different times, different inequality constraints can be active (potentially violated) or inactive. The inactive inequality constraints can be ignored, while the active inequality constraints can be replaced with equality constraints forming an optimization problem subject only to equality constraints.

Replacement of the active inequality constraints with equality constraints, results in an update of the matrix K and preconditioning matrix P for each active-set change. Thus, the computational demand lies not only in constructing the preconditioner P, but mostly in updating the matrix P in response to adding or removing a constraint from the current active set. In addition, replacement of the active inequality constraints with equality constraints, results in a KKT matrix K that includes a block-diagonal Hessian and a block-sparse Jacobian matrix. The matrix P can also be formed to have a particular block sparsity structure that is computationally cheaper to form, update, and to factorize than a dense matrix.

In such a manner, it is realized that a change to the current active set results in a low-rank update to the block-sparse Jacobian matrix. In this context, an update to a matrix is considered to be of low rank when the rank of the difference between the original and the updated matrix is small, relatively to the dimensions of the matrix. As a special case, it is realized that adding or removing only one constraint to or from the current active set, results in a rank-one update to the block-sparse Jacobian matrix. In the case that exactly two constraints are either added or removed to or from the current active set, this results in a rank-two update to the block-sparse Jacobian matrix. Despite the fact that the preconditioner is a function of the entire KKT matrix K, the low-rank update of the constraint Jacobian matrix leads to a low-rank update of the entire preconditioner.

To that end, some embodiments use active-set optimization with preconditioned iterative solver while preserving the sparsity structure of the preconditioning matrix P, e.g., a block-tridiagonal structure.

Figure 3C:
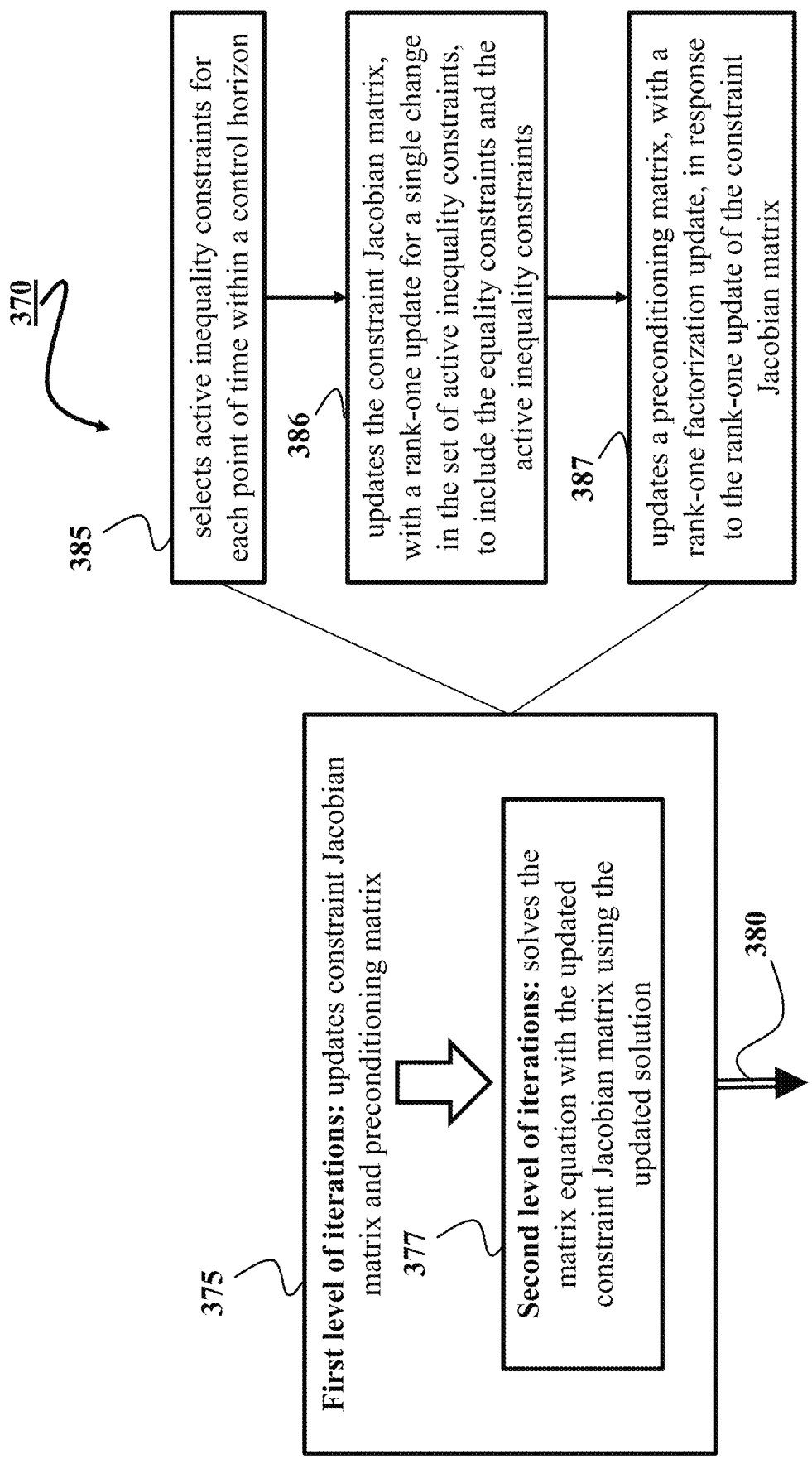
FIG. 3C shows a schematic of a double-layered controller according to some embodiments.

FIG. 3C shows a schematic of a double-layered controller 370 according to some embodiments. The double-layered controller 370 includes a processor to implement the principles of the predictive controller 110 with computational cost of $O(Nm^2)$. The double-layered controller 370 is configured to solve, at each control step, a matrix equation of necessary optimality conditions to produce a control solution 380 and to control the system using the control solution to change a state of the system. The matrix equation includes a block-structured matrix having a constraint Jacobian matrix of the equality constraints of the system. The processor determines the control solution iteratively using two levels of iterations including a first level of iterations 375 and a second level of iterations 377 performed within an iteration of the first level of iterations.

The first level of iterations 375 is performed until a first termination condition is met, e.g., a converging criteria and/or a number of iterations is reached. The purpose of the first level of iterations is to update constraint Jacobian matrix and preconditioning matrix. For example, an iteration of the first level selects 385 active inequality constraints for each point of time within a control horizon, updates 386 the constraint Jacobian matrix, with a rank-one update for a single change in the set of active inequality constraints, to include the equality constraints and the active inequality constraints, and updates 387 a preconditioning matrix, with a rank-one factorization update, in response to the rank-one update of the constraint Jacobian matrix. In the case of multiple changes to the set of active inequality constraints, the low-rank update to the constraint Jacobian matrix 386 leads to a low-rank factorization update to the preconditioning matrix 387.

The second level of iterations solves 377 the matrix equation with the updated constraint Jacobian matrix using the updated factorization of the preconditioning matrix to produce the control solution 380. The solution is found iteratively until a second termination condition is met, such as an optimality of the solution criteria and/or a number of iterations. If the control solution 380 is found to be optimal, the solution is used to control the system. Otherwise, the first and the second levels of iterations are repeated.

Figure 4A:
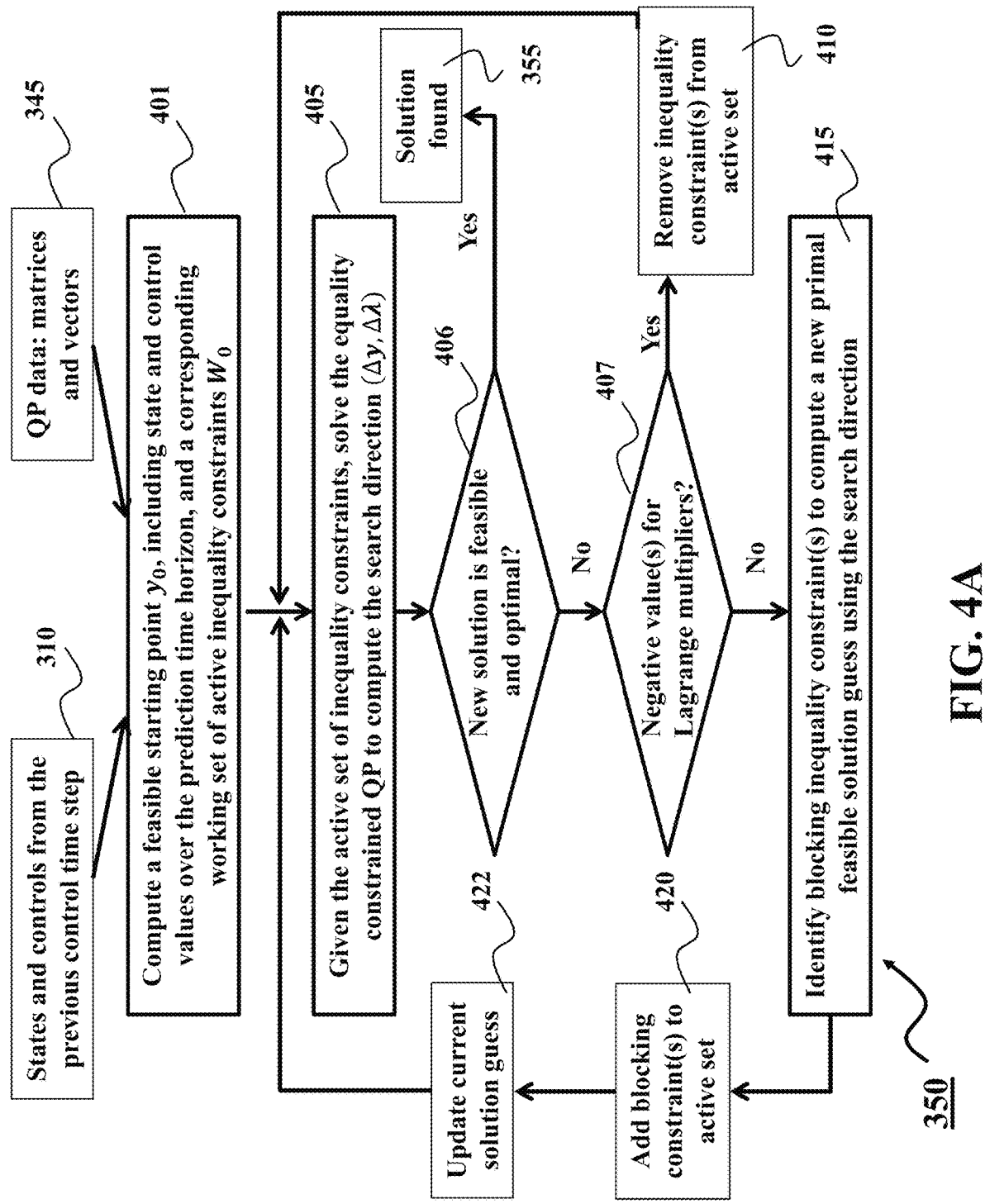
FIG. 4A is a block diagram of an active-set optimization implementing an MPC controller according to some embodiments.

FIG. 4A shows a block diagram and FIG. 4B shows a pseudo code of an active-set based optimization method to compute the optimal control solution 355 at each control time step of the MPC controller 110 according to some embodiments. Some embodiments are based on a primal feasible active-set method, where a primal feasible initial starting point 401 is used to form a guess for the optimal control solution 355 and a guess for the active set of inequality constraints at the optimal control solution. Some embodiments compute the primal feasible initial starting point 401 using the state and control values from the previous control time step 310 and using the QP matrices and vectors 345. This solution guess and the active set of inequality constraints is updated iteratively while the active-set strategy ensures that the control solution guess, consisting of a sequence of state and control values over the prediction time horizon, remains primal feasible from one iteration of the active-set method to the next iteration.

In each iteration of an active-set method, the method solves the equality constrained QP that corresponds to the current guess of active inequality constraints 405. The required computational effort for the solution of an equality constrained QP is cheaper than the original solution of the inequality constrained QP 350. In case the resulting new control solution guess is both optimal and feasible 406, then the optimal solution 355 to the original inequality constrained QP 350 is found. If this is not the case, but one of the Lagrange multipliers corresponding to the set of active inequality constraints is negative 407, then the corresponding inequality constraint(s) can be removed from the current guess of the active set 410. Finally, if the new solution guess is not optimal and feasible but all Lagrange multipliers corresponding to the active inequality constraints are positive, then a blocking inequality constraint can be identified in order to compute a new primal feasible solution guess 415. This blocking inequality constraint(s) can then be added 420 to the current guess of the active set of inequality constraints and the optimal control solution guess can be updated accordingly 422.

In some embodiments, the iterations of the active-set method continue until a termination condition is met, e.g., an optimal and feasible control solution is found 355 or the maximum number of iterations is reached 402. Note that the search direction $(\Delta y, \Delta \lambda)$, that is obtained as the solution of the equality constrained QP in each active-set iteration 405, results in a family of candidate vectors $y+\alpha \Delta y$ that are primal feasible with respect to the equality constraints and the inequality constraints that are contained in the active set, regardless of the value for $\alpha$. Therefore, some embodiments identify the most blocking constraint as the inequality constraint for which the step length $\alpha>0$ is the largest, such that the blocking inequality constraint is satisfied exactly as an equality constraint 421 and all other inequality constraints are satisfied too.

In case that at least one of the Lagrange multipliers corresponding to the active inequality constraints is negative 407, then some embodiments remove the inequality constraint that corresponds to the most negative Lagrange multiplier from the current active set 410. However, some embodiments can alternatively decide to remove a different constraint, corresponding to a negative Lagrange multiplier, from the active set or some embodiments can decide to remove multiple constraints from the active set at once 410. Similarly, some embodiments can add multiple inequality constraints at once to the active set 420 in one iteration. And some embodiments reverse the order between deciding to remove 410 or add 420 (a) constraint(s) from/to the active set, i.e., such embodiments first try to identify the block inequality constraint 415 before checking for negative Lagrange multipliers corresponding to the active inequality constraints 407.

Figure 5A:
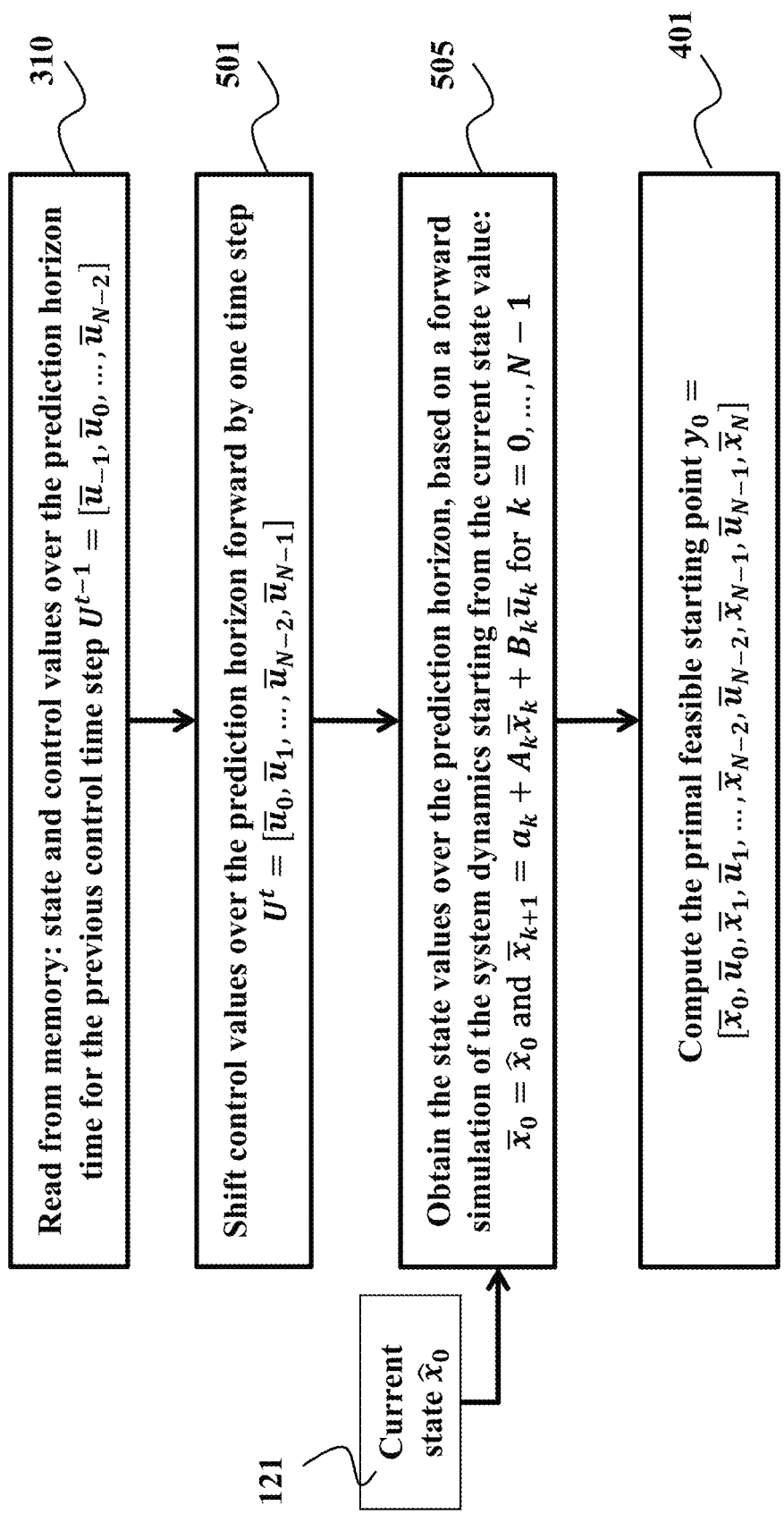
FIG. 5A is a block diagram of an initialization procedure for an active-set based MPC controller according to some embodiments.

FIG. 5A shows a block diagram of a procedure to compute the primal feasible initial starting point 401 for an active-set based MPC controller. Some embodiments read the state and control values over the prediction horizon for the previous control time step from the memory 310 and use these values directly to compute the initial starting point 401. In some other embodiments, the previous state and control values are read from the memory and the control inputs are shifted by one step in time 501 in order to form a better guess for the optimal control solution at the next control time step. Given this shifted control solution guess, the corresponding state values can be obtained based on the current state estimate 121 and the discrete-time system dynamics 505. The resulting combination of state and control values then forms a primal feasible starting point 401 for the active-set optimization algorithm.

In some embodiments, the presence of state-dependent inequality constraints can prevent the initialization procedure from FIG. 5A to result in a primal feasible initial starting point. Instead, some embodiments are based on a slack variable reformulation in order to formulate a new QP where the state-dependent inequality constraints are replaced by soft constraints. Some embodiments are based on an L1 penalization of these slack variables such that the reformulated QP is equivalent, i.e., the optimal control solution for the new QP is also the unique optimal control solution to the original inequality constrained QP in case that the original optimization problem is feasible. Other embodiments can be based on an L2 penalization, i.e., least squares cost for these slack variables. In order to preserve the optimal control sparsity structure of the optimization problem 350 in FIG. 3B, at least one slack variable needs to be introduced to reformulate the inequality constraints for each time interval independently. This slack variable(s) can be considered as additional, artificial control input(s) to the system.

Figure 5B:
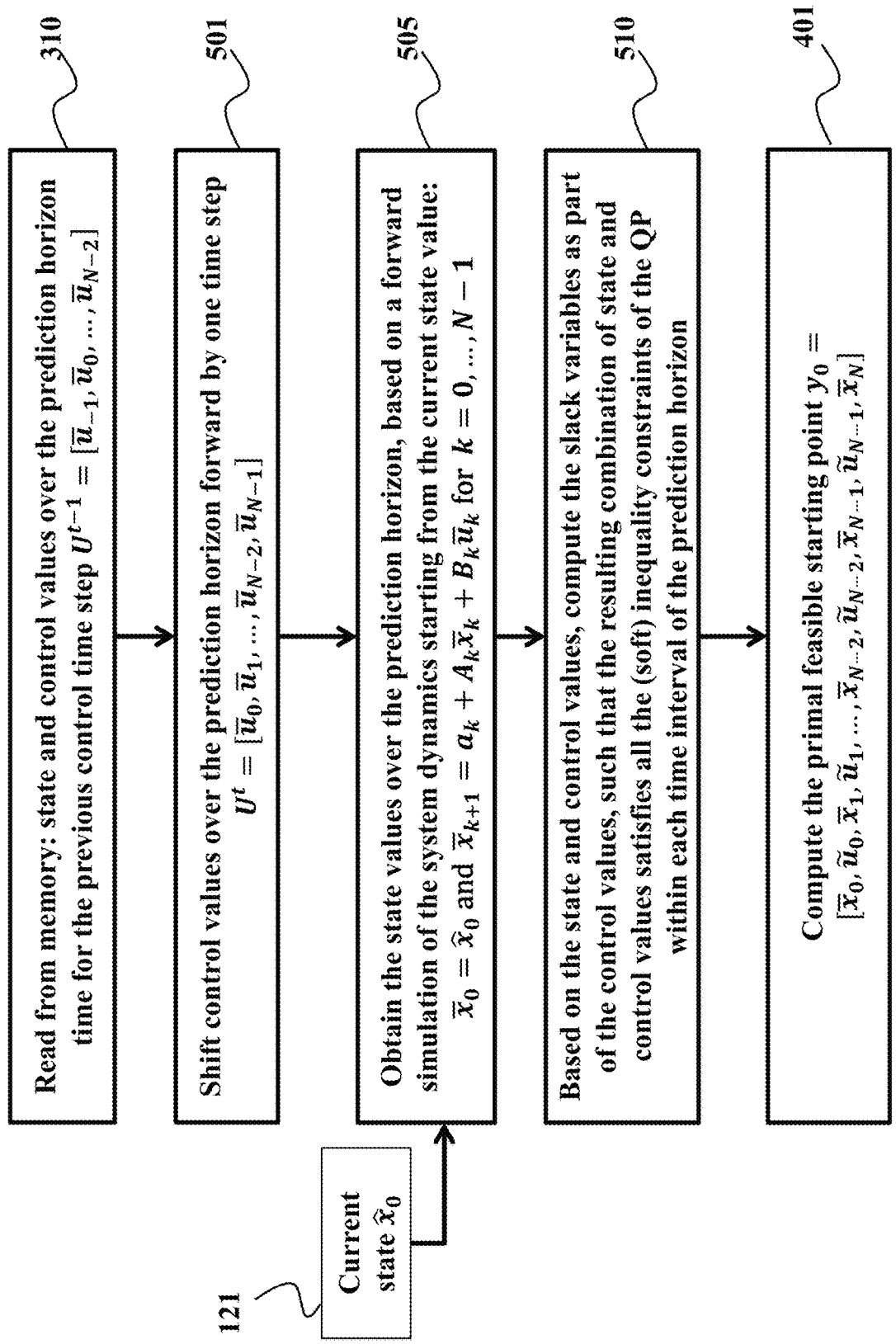
FIG. 5B is a block diagram of an initialization procedure with slack variables for an active-set based MPC controller according to some embodiments.

FIG. 5B shows a block diagram of a procedure to compute the primal feasible initial starting point 401 for an active-set based MPC controller, including slack variables to reformulate the state-dependent inequality constraints into soft constraints to ensure primal feasibility according to some embodiments. Some embodiments therefore compute a starting point 401 by reading the previous values from the memory 310, shifting the control inputs by one time step 501 and simulating the system dynamics to compute the state values 505, given the current state of the system 121. Given the resulting states and control inputs, the values for the slack variables can be computed such that all soft inequality constraints are satisfied 510. In some embodiments, the slack variable for each time interval can be set to the smallest (positive) value in order to satisfy all soft constraints in that particular time interval. In some other embodiments, based on the initial guess for the state and control values, a Phase I procedure step is used to compute an updated set of state and control values that satisfy all the (soft) inequality constraints of the QP within each time interval of the prediction horizon.

Figure 6A:
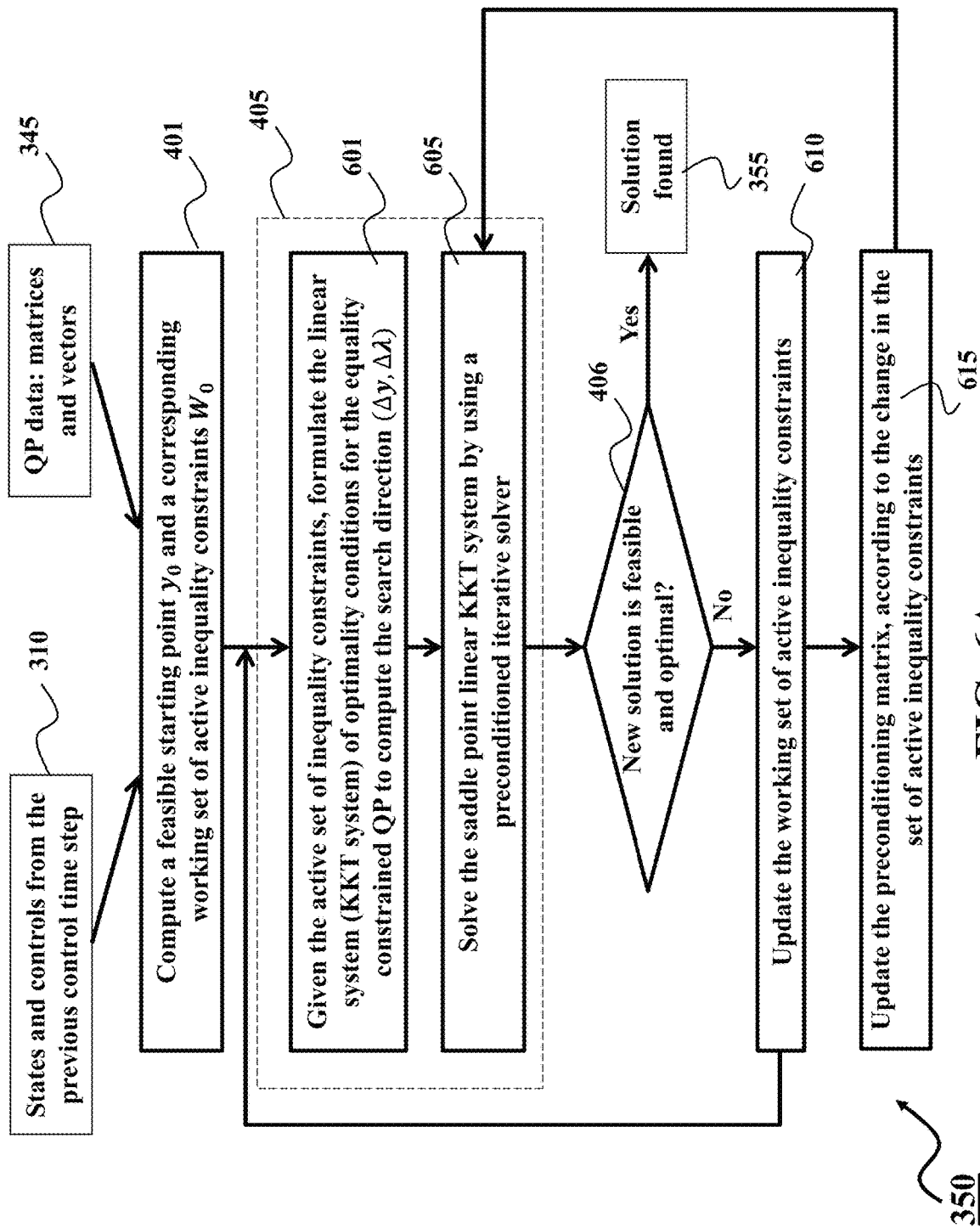
FIG. 6A is a block diagram of a preconditioned iterative solver within an active-set based MPC controller according to some embodiments.

FIG. 6A shows a block diagram of an active-set optimization algorithm based on a preconditioned iterative solver to compute a solution to the equality constrained QP in each of the active-set iterations during one time step of the MPC controller, according to some embodiments of the invention. Given the current guess for the active set of inequality constraints, an equality constrained QP needs to be solved 405 in order to compute a new search direction ($\Delta y$, $\Delta \lambda$). The necessary conditions for optimality, i.e., the Karush-Kuhn-Tucker (KKT) conditions for an equality constrained QP correspond to a saddle point linear system that needs to be solved in each iteration 601. In embodiments of the invention, this saddle point linear KKT system is solved efficiently using a preconditioned iterative solver 605. The resulting new control solution guess is either feasible and optimal 406 such that the optimal control solution is found 355, or an update is needed to the current working set of active inequality constraints 610.

As shown in FIG. 4A and FIG. 4B, each update of the active set corresponds to constraints being either added 420 or removed 410 to/from the current active set, depending on whether there are negative Lagrange multiplier values 407 or there are blocking inequality constraints 415. Some embodiments are based on the realization that these updates to the current working set of active inequality constraints 610 lead to low-rank updates to the coefficient matrix in the linear KKT system that needs to be solved in each iteration of the active-set method 601. When using a preconditioned iterative solver to compute the solution to each saddle point linear KKT system 605, these updates to the current working set 610 lead to corresponding updates of the preconditioning matrix 615.

Figure 6B:
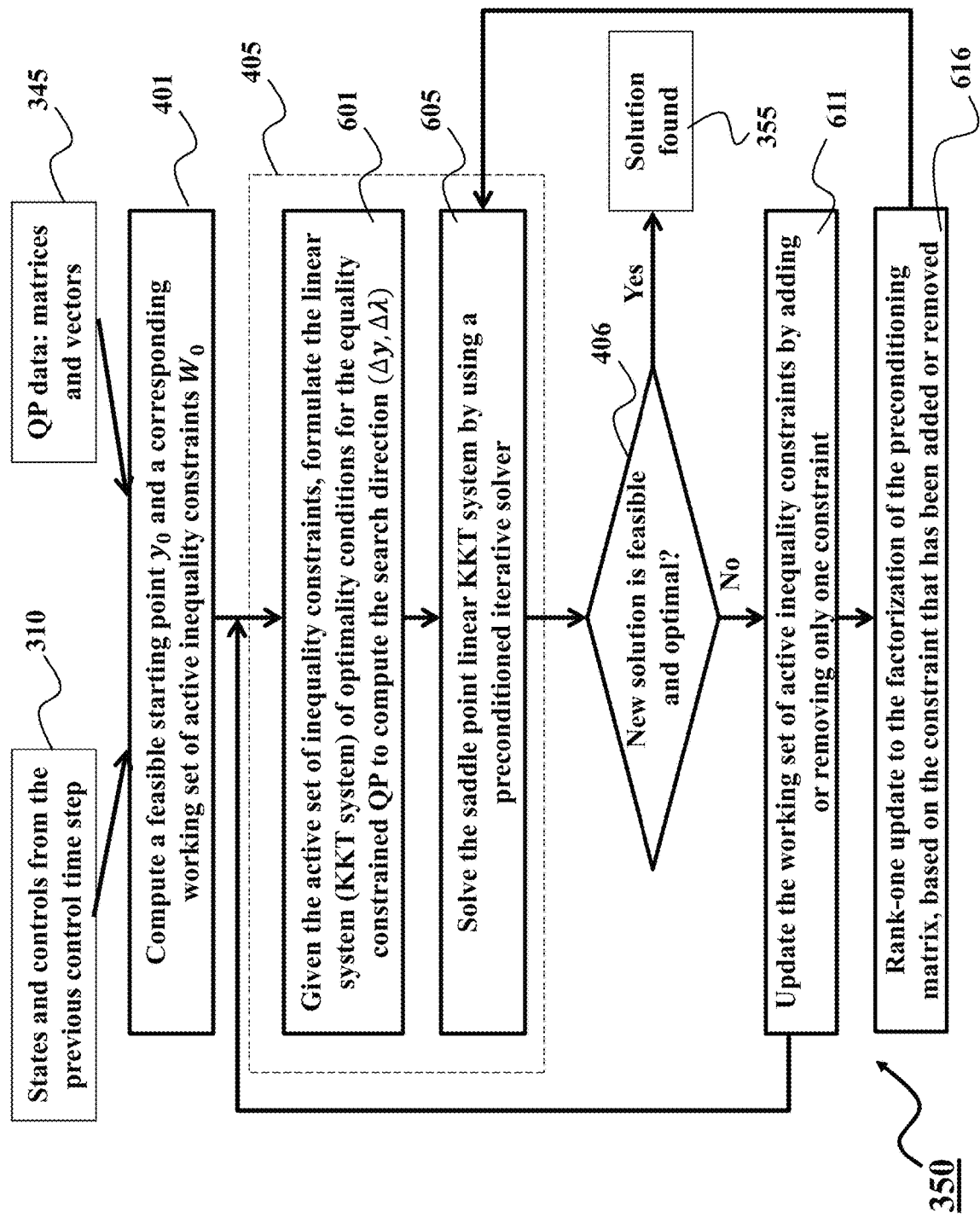
FIG. 6B is a block diagram of the rank-one updates of the preconditioner within an active-set based MPC controller according to some embodiments.

FIG. 6B shows a block diagram of an active-set optimization algorithm, based on a preconditioned iterative solver, where each active-set change corresponds to exactly one or multiple inequality constraint(s) being either added 420 or removed 410 to/from the current active set. This update to the current active set 611 results in a low-rank update to the preconditioning matrix that depends directly on the constraint that has been added or removed 616. In some embodiments, a low-rank update to a matrix factorization is computed in order to efficiently apply the inverse of the preconditioner within the iterative solver. More specifically, in the case that only one constraint is either added or removed in the update to the current active set 611, this results in a rank-one update to the preconditioning matrix and its factorization 616.

For a dense n×n matrix, a matrix factorization generally has a computational complexity of $O(n^3)$, while a rank-one update to a precomputed matrix factorization corresponds to a computational complexity of only $O(n^2)$. In the case of a low-rank factorization update, the computational complexity is also $O(n^2)$, as long as the rank is small compared to the dimension n of the n×n matrix. A low-rank factorization update can be carried out either directly or in the form of a sequence of rank-one factorization updates. In general, low-rank updates to matrix factorizations are therefore of a lower order computational complexity than the computation of a new matrix factorization after each update of the active set.

FIG. 7A shows a block diagram with a detailed description of the equality constrained QP (EQP) formulation 700 that locally approximates the original inequality constrained QP 350, given the current active set of inequality constraints. Note that the objective function 701 in the EQP is equivalent to the original linear-quadratic objective function 351. Similarly, the linear equality constraints in the EQP 702 and 703 are equivalent to the corresponding constraints in the original QP formulation 352 and 353. The major difference is that the original inequality constraints in the QP formulation 354 have been replaced by a set of active inequality constraints 704, based on the current guess for the active set at the optimal control solution. As mentioned earlier, the solution of the EQP problem 700 requires the solution of a saddle point linear system that describes the necessary KKT conditions of optimality 705.

Some embodiments are based on the realization that the linear system 707, that needs to be solved, has the particular saddle point KKT structure 706. More specifically, the matrix H in the (1,1)-block corresponds to the block-diagonal Hessian in the KKT matrix 708. Some embodiments rely on the property that each of the Hessian block matrices individually is positive (semi-)definite 708. In addition, the matrix A in the (2,1)-block, and its transpose $A^T$ in the (1,2)-block of the KKT matrix 706, defines the block-structured constraint Jacobian matrix in the saddle point linear KKT system. Some embodiments rely on the property that the constraint Jacobian is a matrix of full rank, i.e., each of the rows in the matrix A need to be linearly independent. Embodiments of this invention that are based on a primal feasible active-set method, as described in FIG. 4, automatically maintain the active set of inequality constraints in such a manner that the Jacobian matrix is of full rank in each iteration of the active-set method. In other embodiments, a maximal linearly independent subset of the active set needs to be computed in order to result in a corresponding Jacobian matrix of full rank.

Figure 7B:
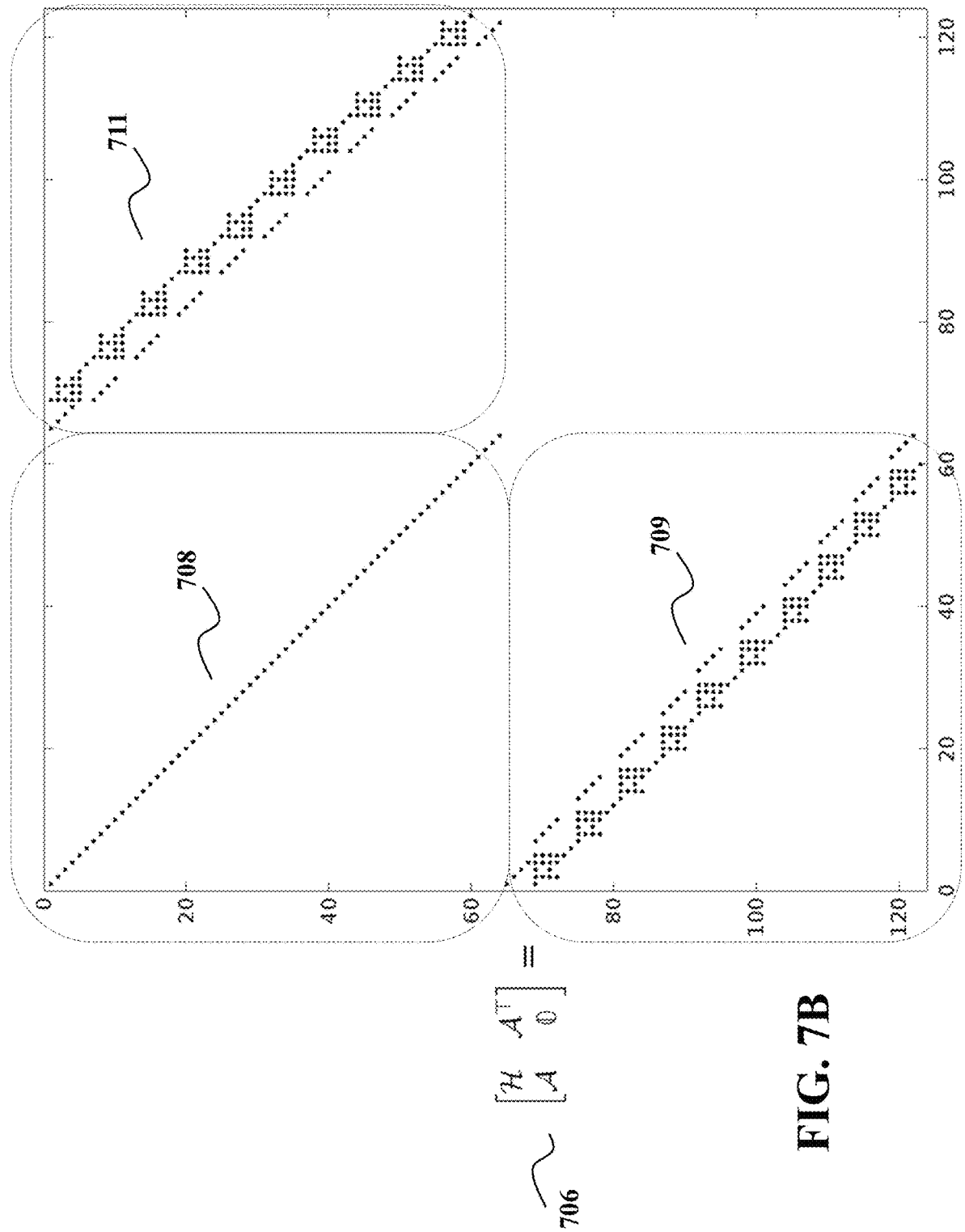
FIG. 7B is a schematic of the block-structured coefficient matrix in the KKT linear system that is solved after each active-set change in the MPC controller according to some embodiments.

FIG. 7B shows a schematic of a sparsity structure for the KKT matrix 706 in the saddle point linear system that needs to be solved after each active-set change by some embodiments. In some embodiments, the block-diagonal Hessian matrix simplifies into a diagonal Hessian matrix 708 when each of the Hessian block matrices is diagonal, which can typically reduce the required computational effort to solve the corresponding saddle point linear KKT system. In addition, the constraint Jacobian matrix 709 and its transpose 711 in the KKT matrix show a typical optimal control block-sparsity structure that is exploited in the efficient solution of each saddle point linear KKT system, according to embodiments of this invention.

Figure 8:
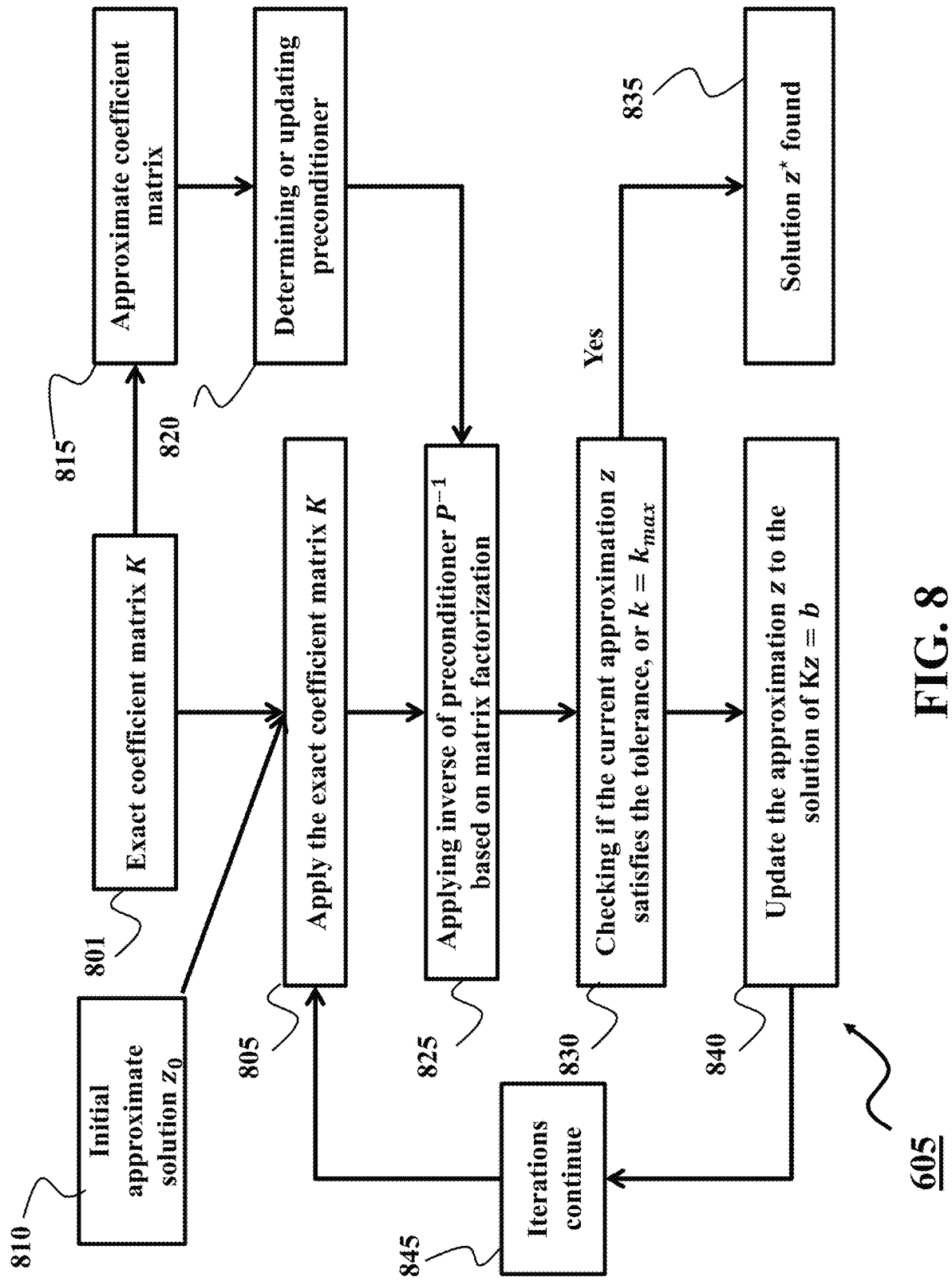
FIG. 8 is a block diagram of a preconditioned iterative solver that is used to solve the linear KKT system in each iteration of the active-set optimization according to some embodiments.

FIG. 8 shows an example of a preconditioned iterative method for solving the matrix equation, i.e., the saddle point linear system Kz=b, in each iteration of the active-set based MPC method. The exact coefficient matrix K 801 is defined as the KKT matrix 706 with the optimal control structured block-sparsity as illustrated in FIG. 7B. The main computational effort consists of applying the coefficient matrix K 805 and applying the inverse of the preconditioner $P^{-1}$ 825, in order to iteratively 845 update an approximation to the solution of the linear system Kz=b 840 until the solution z* is found 835.

Each iteration of the solver requires at least one matrix-vector multiplication with the exact coefficient matrix K 805, which can be executed efficiently by exploiting the optimal control structured block-sparsity as shown in FIG. 7. Given this block-sparse structure of the Hessian 708 and Jacobian matrix 709 in FIG. 7B, the resulting computational complexity for these matrix-vector multiplications is therefore $O(Nm^2)$, where N is the control horizon length and in is the number of state and control variables. Some embodiments rely on a diagonal Hessian matrix which further reduces the corresponding computational cost. The sparsity of the Jacobian matrix for the active inequality constraints within the block matrices, e.g., in case of simple bounds that are active for some of the state or control variables in a certain time interval, can additionally be exploited in order to reduce the practical computational cost of applying the coefficient matrix K 805.

The overall computational cost for solving each saddle point linear system is proportional to the number of iterations. A stopping criterion 830 checks if the current approximation z satisfies a given tolerance or whether the maximum number of iterative steps $k=k_{max}$ is reached. If this stopping criterion is satisfied, then the solution z* is found 835, otherwise the approximation z is updated 840 and the iterations continue 845. Some examples of the iterative method are the preconditioned generalized minimal residual (PGMRES) method, the preconditioned minimal residual (PMINRES) and a projected preconditioned conjugate gradient method (PPCG).

In some embodiments, an initial approximate solution $z_0$ 810 is used to start the iterative procedure for the solution of the saddle point linear system. This approximate solution guess can be based on the solution to the previous saddle point linear system 605, given the active-set change from one iteration of the active-set method to the next 601. Alternatively, some embodiments compute the change of the primal and dual variables in the saddle point linear system 706, such that a reasonable solution guess consists of zero values instead.

Some embodiments determine or update 820 at least a part of a preconditioning matrix using either the exact coefficient matrix K 801 or an approximate coefficient matrix 815. The preconditioner can first be generated and then applied, e.g., in every step of the main iterative cycle 825. In some embodiments, the preconditioner is related to a preconditioning function that is generated 820 outside of the main iterative cycle, wherein the preconditioning function can be applied to a vector in order to return the product between the matrix inverse of the preconditioner $P^{-1}$ and that specific vector 825. For example, in some embodiments of the iterative method, the preconditioning function acts on the residual b−Kz in order to compute $P^{-1}(b-Kz)$. Application of the preconditioner accelerates the convergence of the iterative method without significantly increasing the computational costs per iteration, thus, leading to an overall improved performance of the MPC controller.

In some embodiments of this invention, a block-structured preconditioner is used such that its matrix factorization can be efficiently determined, updated 820 and applied 825. The block-structured matrix factorization therefore requires a computational cost of complexity $O(Nm^3)$, where N is the control horizon length and in is the number of state and control variables. In some embodiments, the computation of this matrix factorization, which is needed for the solution of each saddle point linear system, is however avoided by instead updating the matrix factorization for the preconditioner from one iteration of the active-set method to the next iteration 615. In case only one constraint is either added or removed to/from the active set in each iteration, such an update corresponds to a rank-one factorization update of complexity $O(Nm^2)$ that preserves the block-structured sparsity of the preconditioning matrix. Similarly, applying the inverse of the preconditioner $P^{-1}$ to a vector, given this block-sparse matrix factorization, requires a computational cost of complexity $O(Nm^2)$.

If an approximate inverse of an approximate coefficient matrix is used for the matrix form of the preconditioner, i.e., $P^{-1} \approx K^{-1}$, the number of iterations in the preconditioned iterative method is radically reduced. In an exact case, where the preconditioner 820 at a given time step coincides with the inverse of the exact coefficient matrix 801, i.e., $P^{-1}=K^{-1}$, the number of iterations in the preconditioned method is reduced to one. However, the exact case can be computationally expensive, thus, some embodiments are based on a recognition that, for the purpose of the preconditioning setup or update 820 and application 825, an approximate coefficient matrix 815 can be easier and faster to factorize, compared to their exact counterparts, while still leading to high-quality preconditioning. Similarly, determining, updating or applying the preconditioner 820 does not require full accuracy and can be done using a reduced number of arithmetic bits on the computer-based controller 110. Another embodiment can determine and/or apply the factorization of the preconditioner in the low precision arithmetic from the already computed approximate coefficient matrix.

Figure 9A:
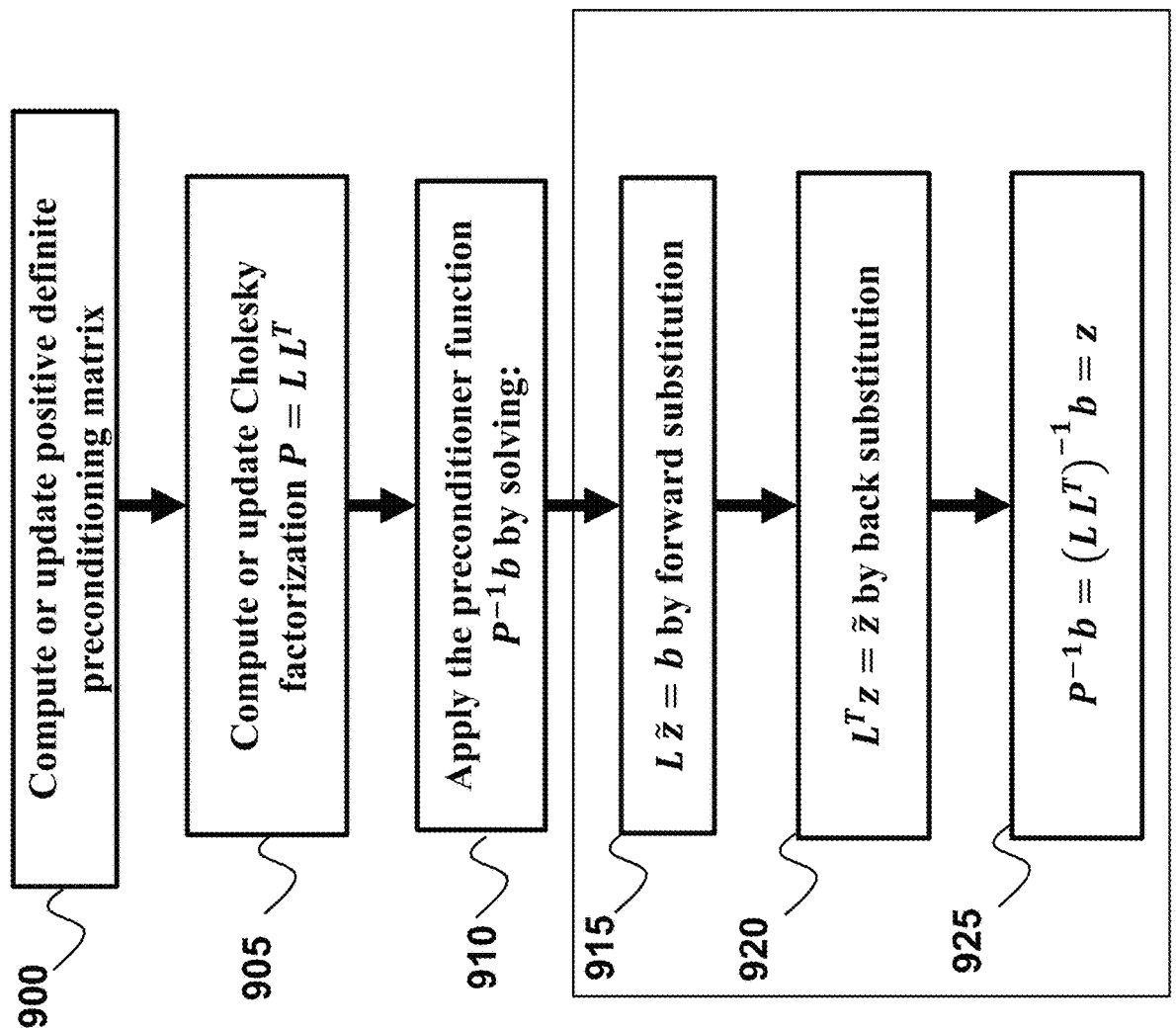
FIG. 9A is a block diagram that illustrates the application of a positive definite preconditioning matrix, within an iterative solver, using a Cholesky factorization according to some embodiments.

FIG. 9A shows a block diagram of how to apply a preconditioner, based on a Cholesky matrix factorization (or decomposition) of the preconditioner matrix 900 used by one embodiment. The preconditioner setup 905 determines the matrix factorization $P=L L^T$, where the preconditioning matrix P is positive definite and the matrix L is lower-triangular. This decomposition $P=L L^T$ can be computed based on a new matrix factorization at the cost of $$\frac{n^3}{3}$$

floating point operations (FLOPS) in case P is a n×n matrix, i.e., the computational complexity is $O(n^3)$. Instead, given a low-rank update to the preconditioning matrix 616, (a) rank-one update(s) of the Cholesky factorization of the matrix can be carried out with a computational complexity of $O(n^2)$ instead. The application of the preconditioner function 910 includes the following steps. First, the matrix equation $L \tilde{z}=b$ is solved by forward substitution 915, using the fact that the matrix L is lower-triangular. Then, the matrix equation $L^T z=\tilde{z}$ is solved by back substitution 920, using the fact that the matrix $L^T$ is upper-triangular. Both the forward and backward substitution, using the Cholesky factors L and $L^T$, can be carried out with a computational complexity of $O(n^2)$. Finally, the result of applying the preconditioner is determined 925 as $P^{-1}b=(L L^T)^{-1}b=z$.

Figure 9B:
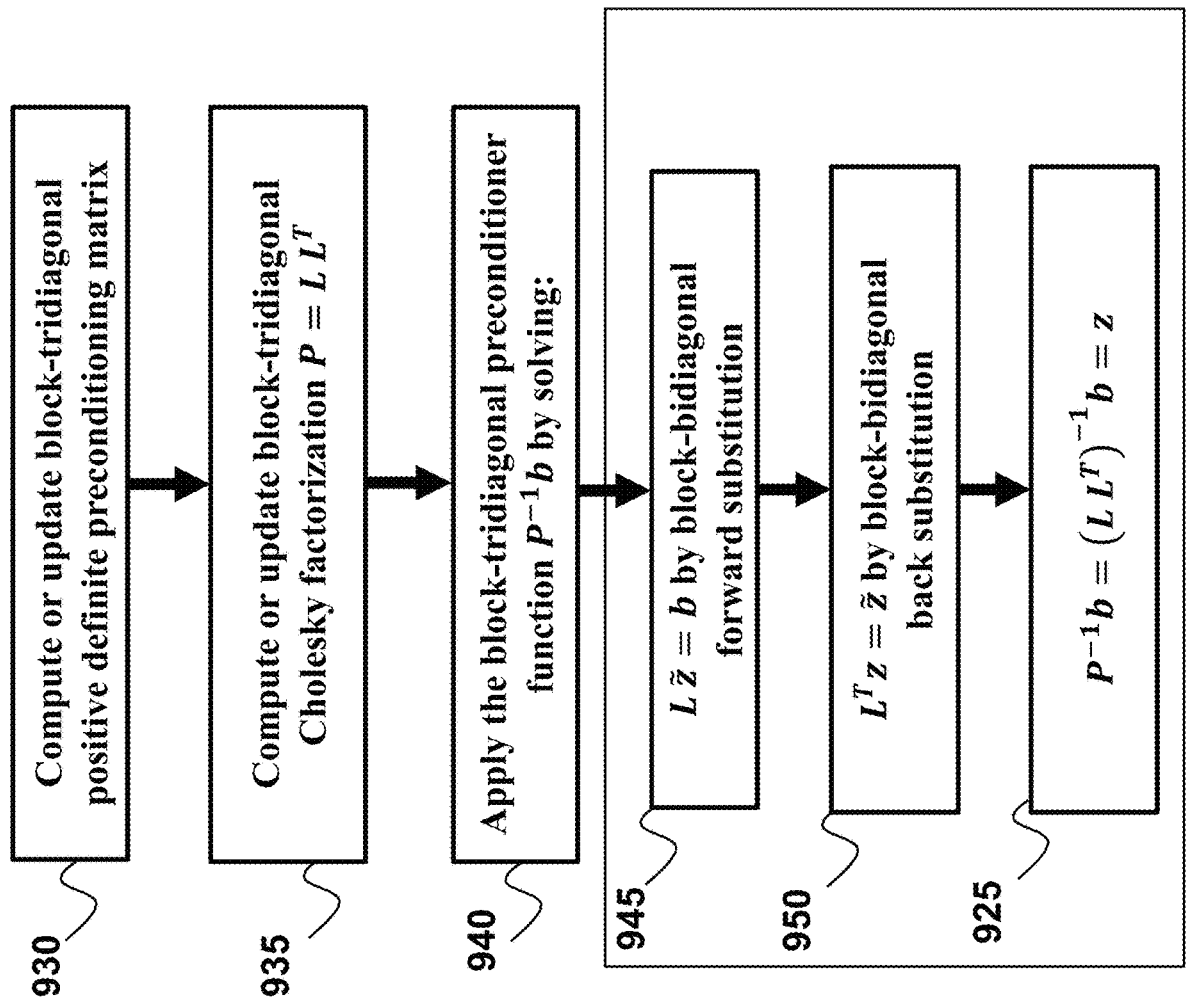
FIG. 9B is a block diagram that illustrates a block-structured positive definite preconditioner, based on a block-tridiagonal Cholesky factorization according to some embodiments.

FIG. 9B shows a block diagram of how to apply a block-structured positive definite preconditioner 930, based on a block-tridiagonal Cholesky factorization (or decomposition) of the preconditioner matrix 935 used by one embodiment. The preconditioner setup 935 determines the matrix factorization $P=L L^T$, where the preconditioning matrix P is positive definite and block-tridiagonal and the matrix L is both lower-triangular and lower block-bidiagonal. This decomposition can be computed based on a new block-tridiagonal matrix factorization at a computational complexity of $O(Nm^3)$, where N is the number of blocks and m denotes the dimensions of each block matrix. Instead, given a low-rank update to the preconditioning matrix 616, (a) rank-one update(s) of the block-tridiagonal Cholesky factorization of the matrix can be carried out with a computational complexity of $O(Nm^2)$ instead. The application of the preconditioner function 940 includes the following steps. First, the matrix equation $L\tilde{z}=b$ is solved by block-bidiagonal forward substitution 945, using the fact that the matrix L is both lower-triangular and lower block-bidiagonal. Then, the matrix equation $L^T z=\tilde{z}$ is solved by block-bidiagonal back substitution 950, using the fact that the matrix $L^T$ is both upper-triangular and upper block-bidiagonal. Both the block-bidiagonal forward and backward substitution, using the Cholesky factors L and $L^T$, can be carried out with a computational complexity of $O(Nm^2)$. Finally, the result of applying the preconditioner is determined 925 as $P^{-1}b=(L L^T)^{-1}b=z$.

A Cholesky factorization $P=L L^T$ for a n×n matrix can be recovered in $O(n^2)$ computations after a rank-one modification $\tilde{P}=P+\alpha vv^T$. This is referred to as an update if $\alpha>0$ and as a downdate if $\alpha<0$. In case of a block-tridiagonal Cholesky factorization, the particular block-sparsity structure of the Cholesky factors can be preserved as long as the matrix remains block-tridiagonal after the rank-one modification $\tilde{P}=P+\alpha vv^T$. As mentioned earlier, the computational complexity is $O(Nm^3)$ for the block-tridiagonal Cholesky factorization and $O(Nm^2)$ for the rank-one update based on a rank-one modification of the block-tridiagonal matrix. Note that also the insertion or deletion of a row-column pair in the symmetric matrix P corresponds to a particular type of a rank-one modification and the Cholesky factorization can be updated at the same computational complexity of $O(Nm^2)$. Some embodiments are based on a backward or reverse variant of the block-tridiagonal Cholesky factorization, which has particular advantages when performing the rank-one factorization updates in the context of an MPC controller, given the fact that most of the active-set changes occur during the time intervals earlier in the control prediction horizon.

Figure 10A:
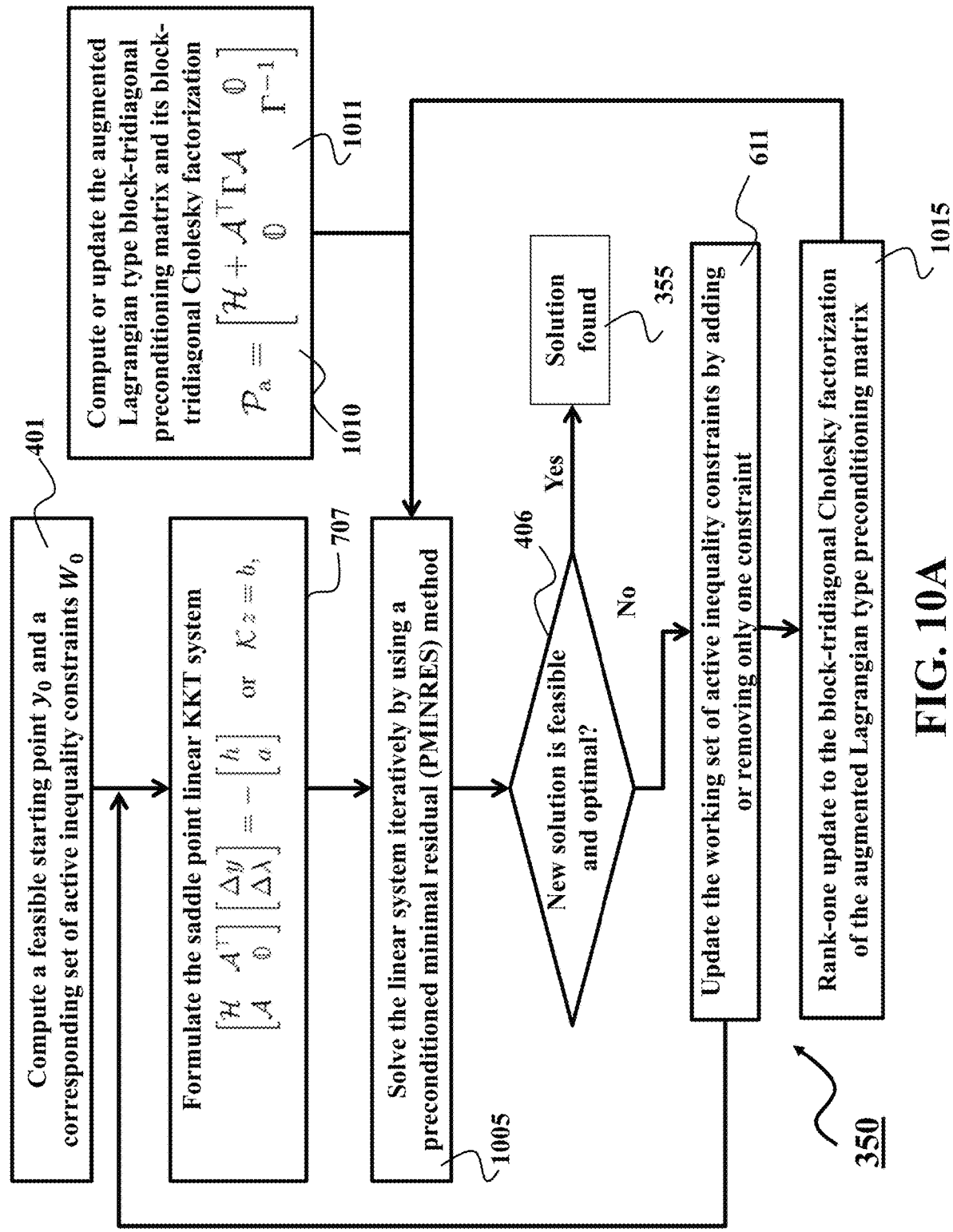
FIG. 10A is a block diagram of an active-set optimization for MPC that uses an augmented Lagrangian type block-tridiagonal preconditioning matrix in combination with an iterative method to solve each linear KKT system according to some embodiments.

FIG. 10A shows a block diagram of an active-set optimization, in order to implement the MPC controller 110, where an augmented Lagrangian type block-tridiagonal preconditioning matrix 1010 is used in combination with either the preconditioned generalized minimal residual (PGMRES) method or the preconditioned minimal residual (PMINRES) method 1005 according to some embodiments. Given the particular optimal control type block-tridiagonal sparsity structure of the preconditioning matrix 1011, a block-tridiagonal Cholesky factorization can be used 1015 to efficiently apply this preconditioner as described in FIG. 9B. Some embodiments are based on a positive definite weighting matrix $\Gamma>0$, such that the preconditioner $P_\alpha$ is also positive definite and a unique Cholesky factorization exists.

Figure 10B:
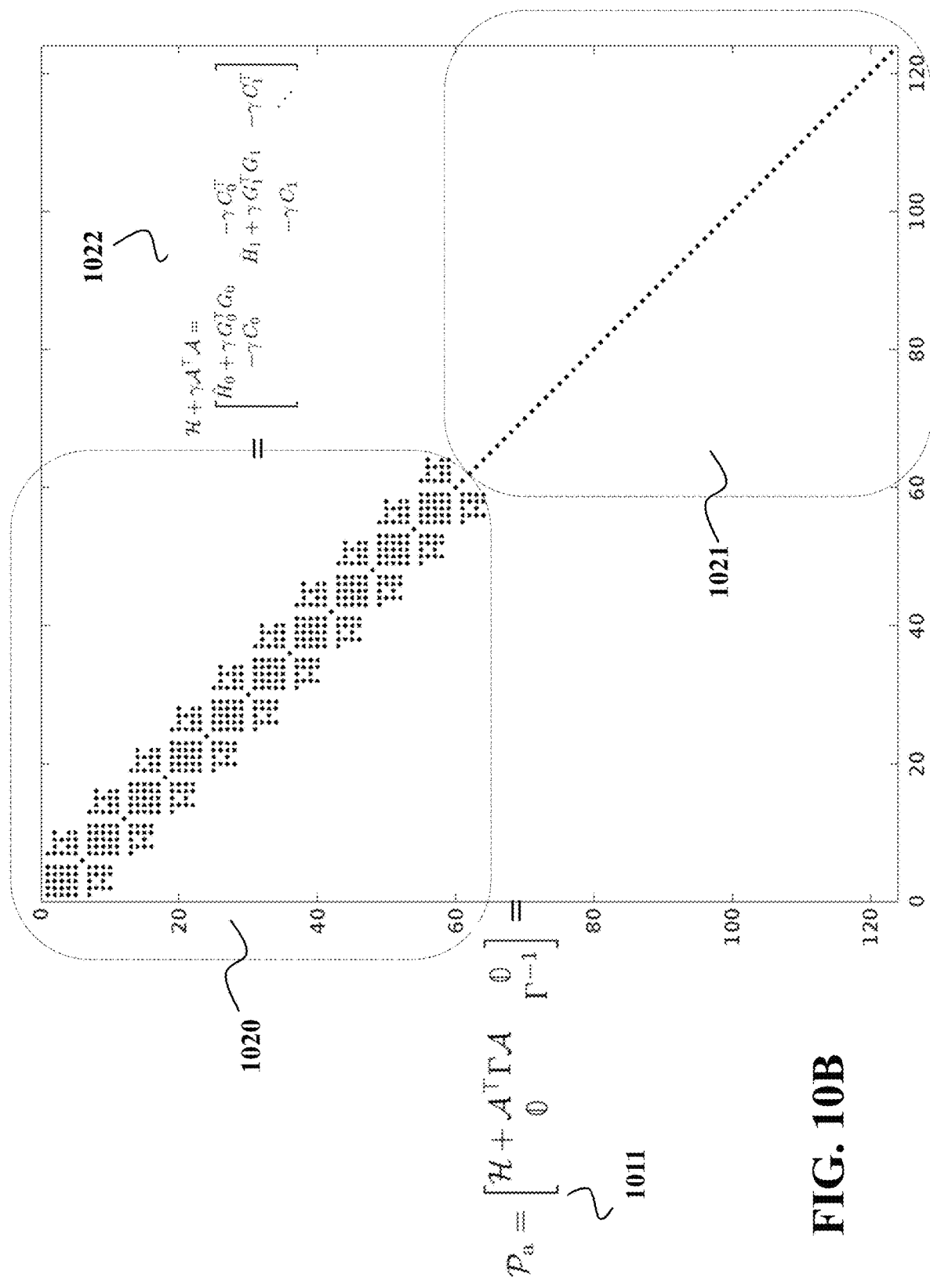
FIG. 10B is a schematic of the augmented Lagrangian type block-tridiagonal preconditioning matrix used within the active-set based MPC controller according to some embodiments.

FIG. 10B shows a schematic of the block-structured symmetric preconditioning matrix $P_\alpha$ 1011, including the block matrix $H+A^T\Gamma$ 1020 with a block-tridiagonal sparsity structure 1022 and the inverse weighting matrix $\Gamma^{-1}$ 1021 according to some embodiments. Some embodiments of the invention are based on the simple choice of a diagonal weighting matrix $\Gamma=\gamma I$, where I denotes the identity matrix and $\gamma>0$ is a positive value. Under some mild conditions, it can be shown that the preconditioner $P_a$ is positive definite for any value of $\gamma>0$ and a unique Cholesky factorization exists. In addition, the eigenvalues of the preconditioned matrix $P_\alpha^{-1}K$ become more clustered around ±1 as the value of $\gamma>0$ increases such that, in general, the preconditioned iterative method will converge faster by increasing the value of $\gamma$. For a sufficiently large value of $\gamma$, the PMINRES method can therefore converge within (close to) two iterations. However, choosing $\gamma$ too large may result in ill-conditioning of the preconditioning matrix $P_a$ such that this parameter should be carefully designed, for example, depending on the available number of arithmetic bits in the computer-based controller 110.

Given an update to the active set, where either an inequality constraint is added or removed 611, a rank-one update is computed for the Cholesky factorization of the preconditioning matrix while preserving the block-tridiagonal sparsity structure. More specifically, for the augmented Lagrangian type preconditioner 1011, adding or removing a constraint results in adding or removing a corresponding row and column of the symmetric weighting matrix $\Gamma=\gamma I$ since its dimensions correspond to the total number of equality constraints and active inequality constraints. In addition, adding or removing a constraint from the active set, corresponds to adding or removing a row in the constraint Jacobian A of the KKT matrix 706, which results in a rank-one update or downdate for the block-tridiagonal Cholesky factorization of the matrix $H+A^T\Gamma A$.

For the specific embodiment in which $\Gamma=\gamma I$, the inverse $$\Gamma^{-1} = \frac{1}{\gamma}I$$

is known such that the block-tridiagonal Cholesky factorization only needs to be computed and updated for the block matrix $H+A^T\Gamma A$ 1022. The computational cost for computing or updating this factorization is, respectively, $O(Nm^3)$ or $O(Nm^2)$ where N is the control horizon length and in is the number of states and controls.

Figure 11A:
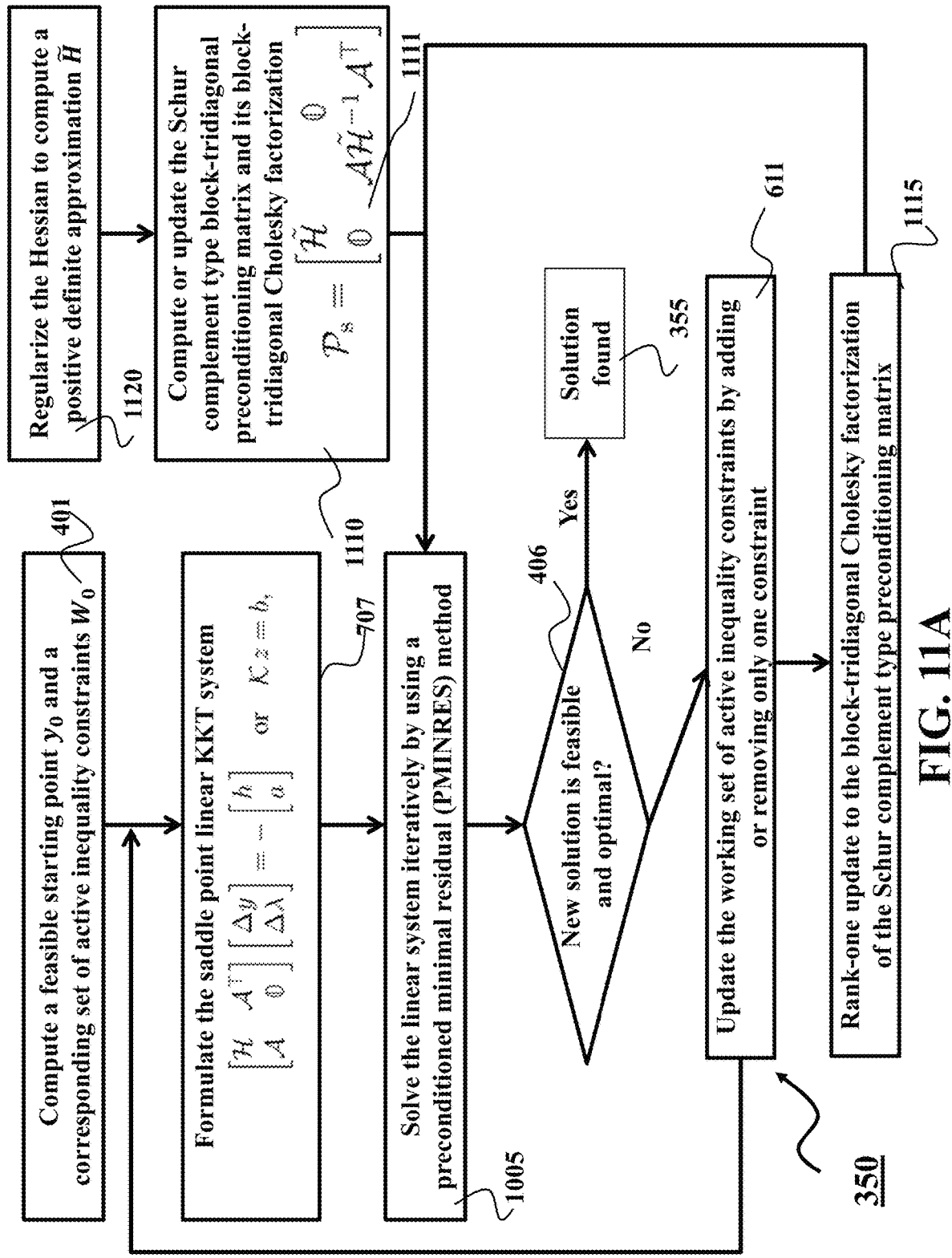
FIG. 11A is a block diagram of an active-set optimization for MPC that uses a Schur complement type block-tridiagonal preconditioning matrix in combination with an iterative method to solve each linear KKT system according to some embodiments.

FIG. 11A shows a block diagram of an active-set optimization algorithm, in order to implement the MPC controller 110, where a Schur complement type block-tridiagonal preconditioning matrix 1110 is used in combination with either the PGMRES method or the PMINRES method 1005 according to one embodiment. Given the particular optimal control type block-tridiagonal sparsity structure of the preconditioning matrix 1111, a block-tridiagonal Cholesky factorization can be used 1115 to efficiently apply this preconditioner as described in FIG. 9B. Some embodiments are based on a Hessian regularization procedure 1120 in order to result in a positive definite Hessian approximation $\tilde{H}>0$, such that the preconditioner $P_s$ is also positive definite and a unique Cholesky factorization exists.

Figure 11B:
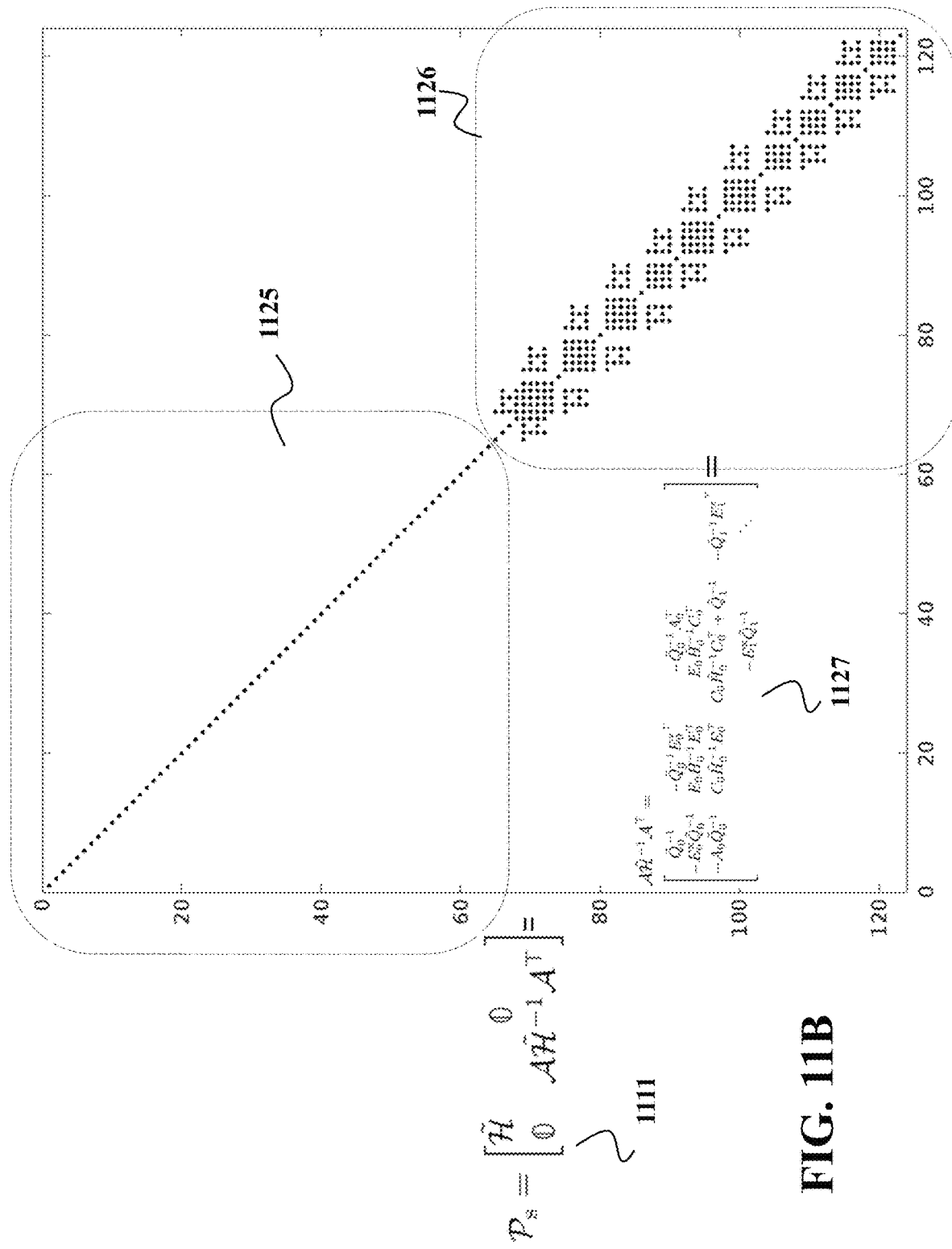
FIG. 11B is a schematic of the Schur complement type block-tridiagonal preconditioning matrix used within the active-set based MPC controller according to some embodiments.

FIG. 11B shows a schematic of the block-structured symmetric preconditioning matrix $P_s$ 1111, consisting of the block-diagonal Hessian approximation $\tilde{H}>0$ 1125 and the block matrix $A\tilde{H}^{-1}A^T$ 1126 with a block-tridiagonal sparsity structure 1127 according to some embodiments. In some embodiments of the invention, the Hessian approximation and therefore also the matrix $A\tilde{H}^{-1}A^T$ are both positive definite such that a unique Cholesky factorization exists for the Schur complement type preconditioner. In addition, the eigenvalues of the preconditioned matrix $P_s^{-1}K$ become more clustered as the Hessian approximation becomes closer to the exact block-diagonal Hessian matrix $\tilde{H}\approx H$ such that, in general, the preconditioned iterative method will converge faster. For a sufficiently close approximation $H\approx\tilde{H}>0$, the PMINRES method can converge within (close to) three iterations. However, choosing $\tilde{H}\approx H$ to be close to semi-definite may result in ill-conditioning of the preconditioning matrix $P_s$ such that the parameters in the Hessian regularization procedure should be carefully designed, for example, depending on the available number of arithmetic bits in the computer-based controller 110.

In some embodiments, the Hessian matrix for the MPC problem formulation is a diagonal matrix 1125, such that the Hessian regularization $H \approx \tilde{H} > 0$ can be done efficiently, e.g., by approximating each of the diagonal elements such that they are individually larger than some positive value $\epsilon > 0$. In general, the Hessian approximation $\tilde{H} \approx H$ becomes closer for smaller values of $\epsilon > 0$ such that the iterative solver converges faster, but $\epsilon$ should be chosen sufficiently large in order to avoid ill-conditioning of the preconditioning matrix $P_s$. In other embodiments, where the Hessian matrix for the MPC problem formulation is a general block-diagonal matrix with dense Hessian blocks, then the Hessian regularization can, for example, be performed heuristically or based on a factorization of the block matrices. Alternatively, a Riccati-based recursion can be performed to make the Hessian matrix positive definite in the range space of the system dynamics and/or of the active inequality constraints. However, such techniques generally require a computational complexity of $O(Nm^3)$, which is the same complexity as that of the block-tridiagonal Cholesky factorization itself.

Given an update to the active set, where either an inequality constraint is added or removed 611, a rank-one update is computed for the Cholesky factorization of the preconditioning matrix while preserving the block-tridiagonal sparsity structure. More specifically, for the Schur complement type preconditioner 1111, adding or removing a constraint does not affect the Hessian matrix or its approximation $\tilde{H} \approx H$. However, adding or removing a constraint from the active set, corresponds to adding or removing a row in the constraint Jacobian A of the KKT matrix 706, which results in adding or removing a row-column pair in the block matrix $A\tilde{H}^{-1} A^T$ 1126 with a block-tridiagonal sparsity structure 1127. This insertion or deletion then results in a rank-one update or downdate for the block-tridiagonal Cholesky factorization of the matrix $A\tilde{H}^{-1}A^T$. Note that this update to the matrix $A\tilde{H}^{-1} A^T$ can be computed easily for a diagonal Hessian matrix $\tilde{H} \approx H$ but, even for a general block-diagonal Hessian matrix, this update can be computed effectively, e.g., based on a Cholesky factorization for the block matrices in the positive definite Hessian approximation $H \approx \tilde{H} > 0$.

Figure 12A:
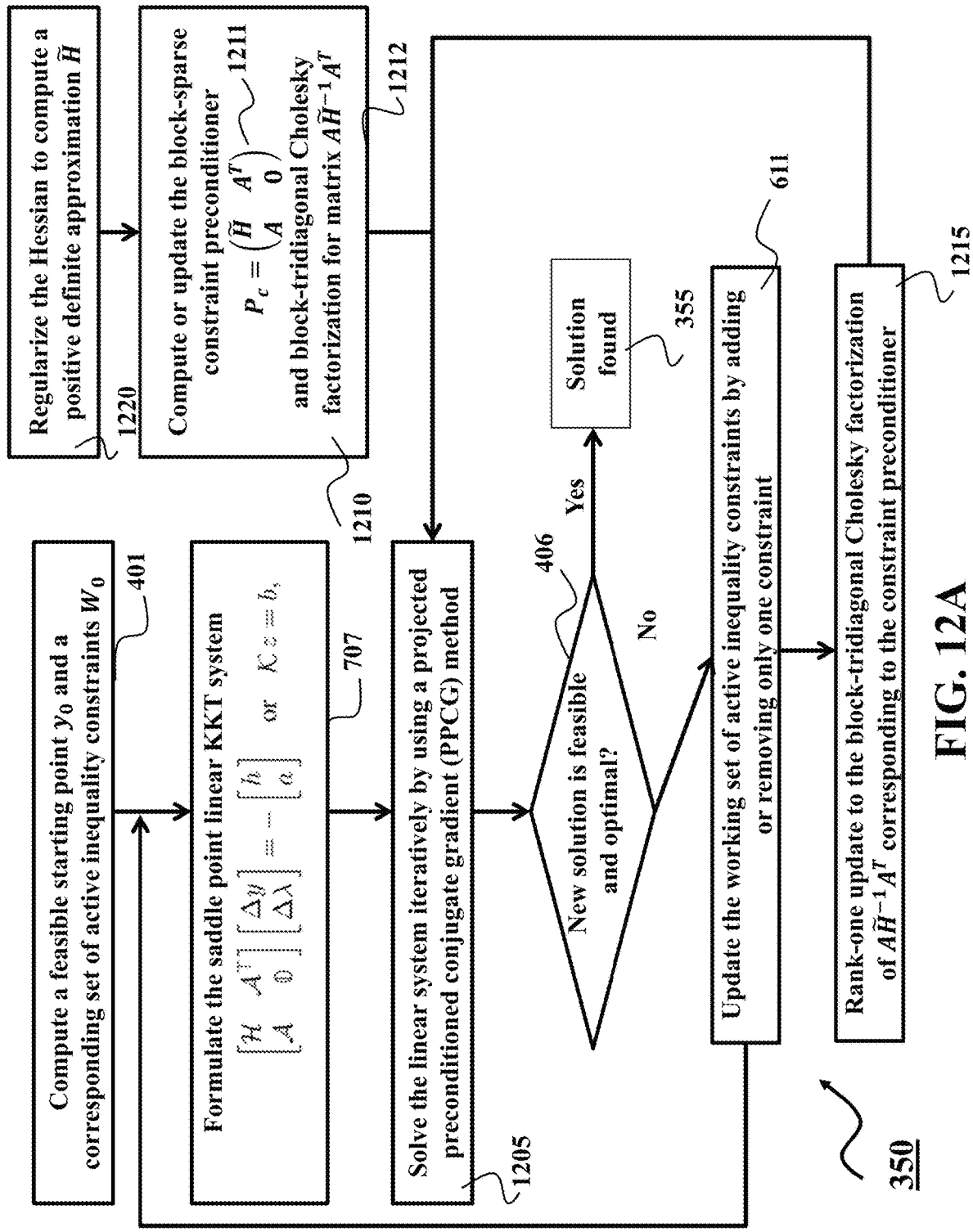
FIG. 12A is a block diagram of an active-set optimization for MPC that uses a constraint preconditioner in combination with a projected preconditioned conjugate gradient method to solve each linear KKT system according to some embodiments.

FIG. 12A shows a block diagram of an active-set optimization of one embodiment. In this embodiment, in order to implement the MPC controller 110, a constraint preconditioner is used 1210, with the same block-sparsity structure as that of the KKT matrix 1211, e.g., as illustrated in FIG. 7B, in combination with a projected preconditioned conjugate gradient (PPCG) method 1205. In order to effectively apply the constraint preconditioner, a block-tridiagonal Cholesky factorization for the matrix $A\tilde{H}^{-1} A^T$ 1212 can be computed and updated according to each active-set change 1215. Similar to the embodiments that are based on a Schur complement type block-diagonal preconditioner, some embodiments use a Hessian regularization procedure 1220 in combination with the constraint preconditioning matrix such that a Cholesky factorization for the Hessian approximation $\tilde{H} > 0$ can be used to effectively apply this preconditioner within the iterative PPCG method.

In the case where the exact Hessian matrix is invertible and the constraint preconditioner is based on the approximation $\tilde{H} = H$, the resulting PPCG implementation corresponds to a direct linear system solution such that no more than one iteration is carried out in theory. In practice, however, multiple conjugate gradient iterations are often still necessary because of the use of a limited number of arithmetic bits on the computer-based controller 110, because of an inexact application of the constraint preconditioner and/or ill-conditioning of the problem data for practical MPC formulations.

FIG. 12B shows a schematic of applying the constraint preconditioner according to one embodiment in order to perform the projection of a vector onto the null space of the equality constraints and active inequality constraints in the constraint Jacobian matrix 1225, without the explicit computation of a basis for the null space. Note that one can use another iterative solver to compute the projection as the solution of the saddle point linear system 1226. In the case of an invertible Hessian approximation $\tilde{H}$, some embodiments apply the constraint preconditioner directly by applying the inverse operators $\tilde{H}^{-1}$ and $(A\tilde{H}^{-1} A^T)$ 1227. In the case of a diagonal Hessian approximation matrix, the inverse operator $\tilde{H}^{-1}$ can be trivially computed. In the more general case of a block-diagonal Hessian matrix, some embodiments are based on a Cholesky factorization for the Hessian block matrices. Similar to the Schur complement type preconditioner, the inverse operator $(A\tilde{H}^{-1} A^T)^{-1}$ can be effectively applied by computing a block-tridiagonal Cholesky factorization for the matrix $A\tilde{H}^{-1} A^T$ 1126 with a block-tridiagonal sparsity structure 1127, for which a rank-one factorization update 1215 can be used in each iteration of the active-set optimization algorithm.

Note that the relatively high cost with complexity $O(Nm^3)$ for carrying out a block-tridiagonal Cholesky factorization can be avoided in the online computations of the MPC controller by performing a hot-start procedure. In some embodiments, based on a linear time-invariant MPC formulation, the Cholesky factorization is then reused from one control time step to the next, which is often referred to as a hot-starting of the active-set method. For this purpose, the factorization needs to be updated based on the active-set changes from the control solution at the previous control time step to the initial feasible starting point of the active-set optimization algorithm during the next control time step.

Figure 13:
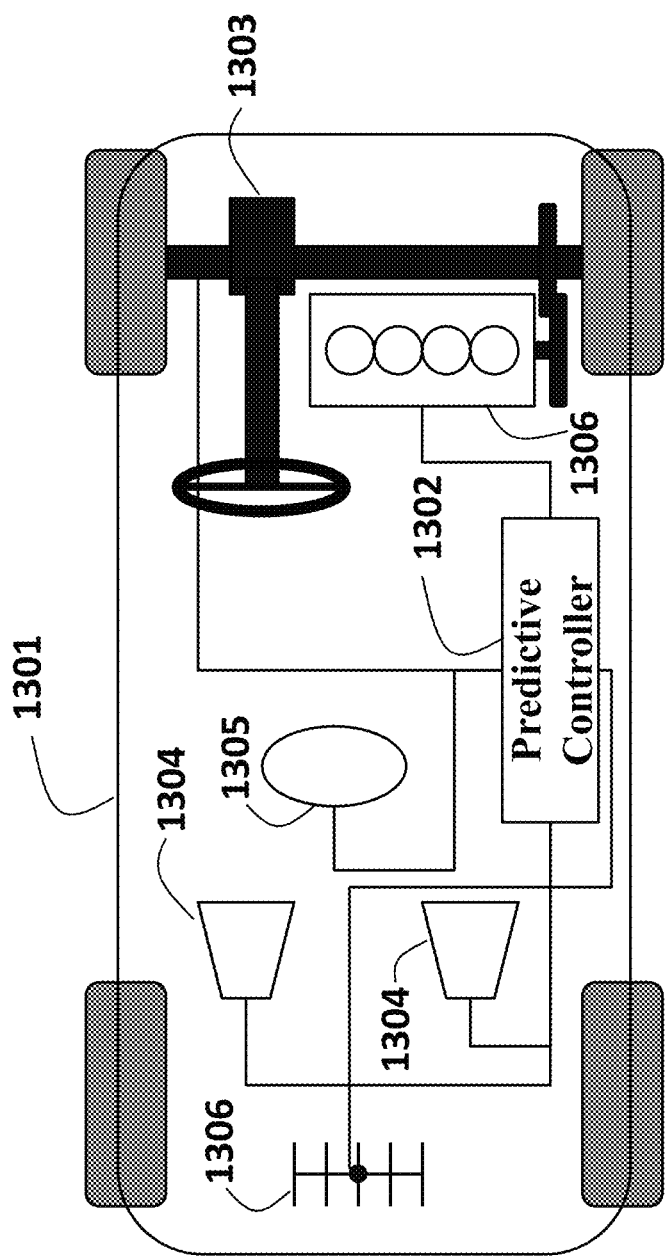
FIG. 13 is a schematic of a vehicle including a controller employing principles of some embodiments.

FIG. 13 shows a schematic of a vehicle 1301 including a predictive controller 1302 employing principles of some embodiments of the invention. As used herein, the vehicle 1301 can be any type of wheeled vehicle, such as a passenger car, bus, or rover. Also, the vehicle 1301 can be an autonomous or semi-autonomous vehicle. For example, some embodiments control the motion of the vehicle 1301. Examples of the motion include lateral motion of the vehicle controlled by a steering system 1303 of the vehicle 1301. In one embodiment, the steering system 1303 is controlled by the controller 1302. Additionally, or alternatively, the steering system 1303 can be controlled by a driver of the vehicle 1301.

The vehicle can also include an engine 1306, which can be controlled by the controller 1302 or by other components of the vehicle 1301. The vehicle can also include one or more sensors 1304 to sense the surrounding environment. Examples of the sensors 1304 include distance range finders, radars, lidars, and cameras. The vehicle 1301 can also include one or more sensors 1305 to sense its current motion quantities and internal status. Examples of the sensors 1305 include global positioning system (GPS), accelerometers, inertial measurement units, gyroscopes, shaft rotational sensors, torque sensors, deflection sensors, pressure sensor, and flow sensors. The sensors provide information to the controller 1302. The vehicle can be equipped with a transceiver 1306 enabling communication capabilities of the controller 1302 through wired or wireless communication channels.

Figure 14:
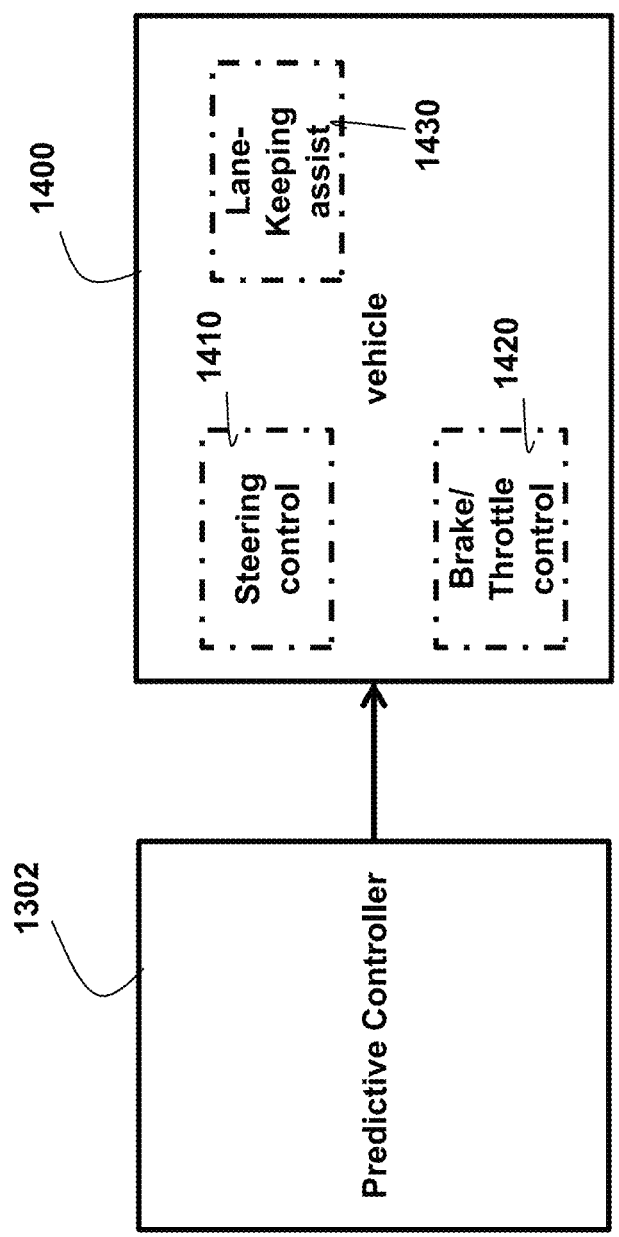
FIG. 14 is a schematic of interaction between the controller employing principles of some embodiments and controllers of the vehicle 1301 according to some embodiments.

FIG. 14 shows a schematic of interaction between the predictive controller 1302 and the controllers 1400 of the vehicle 1301 according to some embodiments. For example, in some embodiments, the controllers 1400 of the vehicle 1301 are steering 1410 and brake/throttle controllers 1420 that control rotation and acceleration of the vehicle 1400. In such a case, the predictive controller 1302 outputs control inputs to the controllers 1410 and 1420 to control the state of the vehicle. The controllers 1400 can also include high-level controllers, e.g., a lane-keeping assist controller 1430 that further process the control inputs of the predictive controller 1302. In both cases, the controllers 1400 maps use the outputs of the predictive controller 1302 to control at least one actuator of the vehicle, such as the steering wheel and/or the brakes of the vehicle, in order to control the motion of the vehicle.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A predictive controller for controlling a system subject to constraints including equality and inequality constraints on state and control variables of the system, comprising:
    an estimator to estimate a current state of the system using measurements of outputs of the system; and
    a controller to solve, at each control step, a matrix equation of necessary optimality conditions to produce a control solution and to control the system using the control solution to change a state of the system, wherein the matrix equation includes a block-structured matrix having a constraint Jacobian matrix of the equality constraints of the system, wherein the controller determines the control solution iteratively using two levels of iterations including a first level of iterations and a second level of iterations performed within an iteration of the first level of iterations,
    wherein the first level of iterations, performed until a first termination condition is met,
        selects active inequality constraints for each point of time within a control horizon,
        updates the constraint Jacobian matrix, with a low-rank update for a change in the set of active inequality constraints, to include the equality constraints and the active inequality constraints, and
        updates a preconditioning matrix, with a low-rank factorization update, in response to the low-rank update of the constraint Jacobian matrix,
    wherein the second level of iterations, performed until a second termination condition is met, solves the matrix equation with the updated constraint Jacobian matrix using the updated preconditioning matrix to produce the control solution.

2. The predictive controller of claim 1, wherein an inequality constraint is active at a point of time when a constraint function of the inequality constraint is equal to a constraint bound of the inequality constraint at the point of time, wherein the first level of iterations selects the set of active inequality constraints based on the current state of the system and a current sequence of control inputs.

3. The predictive controller of claim 2, wherein the first termination condition includes a feasibility of the control solution and an optimality of the control solution,
    wherein the controller tests the optimality and the feasibility of the control solution and exits the first level of iterations when the first termination condition is met, otherwise,
    wherein the control solution is not optimal, the controller removes the active inequality constraint having a negative dual variable that prevents optimality of the control solution and repeats the first level of iterations, and otherwise,
    wherein the control solution is not feasible, the controller updates the current sequence of control inputs with feasible portion of the control solution, adds a blocking inequality constraint in the set of active inequality constraints, and repeats the first level of iterations.

4. The predictive controller of claim 3, wherein the controller, in response to adding the blocking inequality constraint, adds a row in the constraint Jacobian matrix with a first function of coefficients of the blocking inequality constraint and updates the preconditioning matrix with a second function of the coefficients of the blocking inequality constraint.

5. The predictive controller of claim 4, wherein the controller, in response to removing the active inequality constraint, removes a row in the constraint Jacobian matrix that corresponds to the removed active inequality constraint and updates the preconditioning matrix with a reverse of the second function.

6. The predictive controller of claim 1, wherein each change in the set of active inequality constraints corresponds to only one constraint being either added or removed, which leads to a rank-one factorization update for the preconditioning matrix, in response to the rank-one update of the constraint Jacobian matrix.

7. The predictive controller of claim 1, wherein the preconditioning matrix is updated or evaluated using a reduced arithmetic precision, compared to the arithmetic precision that is used for the matrix equation.

8. The predictive controller of claim 1, wherein the preconditioning matrix has a block-tridiagonal structure, wherein each block is positive definite, wherein the controller updates the factorization of the preconditioning matrix while preserving the block-tridiagonal structure.

9. The predictive controller of claim 8, wherein the controller updates the factorization of the preconditioning matrix using a low-rank update of a block-tridiagonal Cholesky factorization.

10. The predictive controller of claim 1, wherein, for a current control step, the controller initializes the Jacobian matrix and the factorization of the preconditioning matrix with values of the Jacobian matrix and the factorized preconditioning matrix determined during a previous control step.

11. The predictive controller of claim 1, wherein the preconditioning matrix is an augmented Lagrangian block-diagonal matrix, and wherein the second level of iterations solves the matrix equation using a minimal residual method.

12. The predictive controller of claim 1, wherein the preconditioning matrix is a Schur complement block-diagonal matrix, and wherein the second level of iterations solves the matrix equation using a minimal residual method.

13. The predictive controller of claim 12, wherein the controller regularizes a Hessian of the matrix of the matrix equation to produce a positive definite approximation of the Hessian of the matrix, and wherein the controller determines elements of the Schur complement block-diagonal matrix based on the approximation of the Hessian of the matrix.

14. The predictive controller of claim 1, wherein the preconditioning matrix is a constraint preconditioner, and wherein the second level of iterations solves the matrix equation using a projected conjugate gradient method.

15. The predictive controller of claim 14, wherein the controller regularizes a Hessian of the matrix of the matrix equation to produce a positive definite approximation of the Hessian of the matrix, and wherein the controller determines elements of the constraint preconditioner based on the approximation of the Hessian of the matrix.

16. The predictive controller of claim 1, wherein the control system is a vehicle, and wherein the controller determines an input to the vehicle based on the control solution, wherein the input to the vehicle includes one or a combination of an acceleration of the vehicle, a torque of a motor of the vehicle, and a steering angle.

17. A vehicle including the predictive controller of claim 1.

18. The method of claim 1, wherein the preconditioning matrix has a block-tridiagonal structure, wherein each block is positive definite, wherein the method updates the factorization of the preconditioning matrix while preserving the block-tridiagonal structure.

19. The method of claim 18, wherein the controller updates the factorization of the preconditioning matrix using a low-rank update of a block-tridiagonal Cholesky factorization.

20. A method for controlling a system subject to constraints including equality and inequality constraints on state and control variables of the system, wherein the method uses a processor coupled with stored instructions implementing the method, wherein the instructions, when executed by the processor carry out steps of the method, comprising:
  estimating a current state of the system using measurements of outputs of the system;
  solving, at each control step, a matrix equation of necessary optimality conditions to produce a control solution; and
  controlling the system using the control solution to change a state of the system,
  wherein the matrix equation includes a block-structured matrix having a constraint Jacobian matrix of the equality constraints of the system, wherein the controller determines the control solution iteratively using two levels of iterations including a first level of iterations and a second level of iterations performed within an iteration of the first level of iterations,
  wherein the first level of iterations, performed until a first termination condition is met,
    selects active inequality constraints for each point of time within a control horizon,
    updates the constraint Jacobian matrix, with a low-rank update for a change in the set of active inequality constraints, to include the equality constraints and the active inequality constraints, and
    updates a preconditioning matrix, with a low-rank factorization update, in response to the low-rank update of the constraint Jacobian matrix,
  wherein the second level of iterations, performed until a second termination condition is met, solves the matrix equation with the updated constraint Jacobian matrix using the updated factorization of the preconditioning matrix to produce the control solution.

21. The method of claim 20, wherein the control system is a vehicle, and wherein the controller determines an input to the vehicle based on the control solution, wherein the input to the vehicle includes one or a combination of an acceleration of the vehicle, a torque of a motor of the vehicle, and a steering angle.

22. A non-transitory computer readable storage medium embodied thereon a program executable by a processor for performing a method, the method comprising:
  estimating a current state of the system using measurements of outputs of the system;
  solving, at each control step, a matrix equation of necessary optimality conditions to produce a control solution; and
  controlling the system using the control solution to change a state of the system,
  wherein the matrix equation includes a block-structured matrix having a constraint Jacobian matrix of the equality constraints of the system, wherein the controller determines the control solution iteratively using two levels of iterations including a first level of iterations and a second level of iterations performed within an iteration of the first level of iterations,
  wherein the first level of iterations, performed until a first termination condition is met,
    selects active inequality constraints for each point of time within a control horizon,
    updates the constraint Jacobian matrix, with a low-rank update for a change in the set of active inequality constraints, to include the equality constraints and the active inequality constraints, and
    updates a preconditioning matrix, with a low-rank factorization update, in response to the low-rank update of the constraint Jacobian matrix,
  wherein the second level of iterations, performed until a second termination condition is met, solves the matrix equation with the updated constraint Jacobian matrix using the updated factorization of the preconditioning matrix to produce the control solution.

* * * * *